US012737040B2

(12) United States Patent
Nagano et al.

(10) Patent No.: US 12,737,040 B2
(45) Date of Patent: Sep. 15, 2026

(54) DISPLAY CONTROL APPARATUS, DISPLAY CONTROL METHOD, AND PROGRAM

(71) Applicant: Sony Group Corporation, Tokyo (JP)

(72) Inventors: Keijiroh Nagano, Tokyo (JP); Tsuyoshi Ishikawa, Kanagawa (JP); Shin Shiroma, Tokyo (JP); Daisuke Tajima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/701,411

(22) PCT Filed: Oct. 26, 2022

(86) PCT No.: PCT/JP2022/039828
§ 371 (c)(1),
(2) Date: Apr. 15, 2024

(87) PCT Pub. No.: WO2023/095519
PCT Pub. Date: Jun. 1, 2023

(65) Prior Publication Data

US 2024/0419242 A1 Dec. 19, 2024

(30) Foreign Application Priority Data

Nov. 26, 2021 (JP) ................................ 2021-191695

(51) Int. Cl.
*G06F 3/01* (2006.01)

(52) U.S. Cl.
CPC .............. *G06F 3/013* (2013.01); *G06F 3/012* (2013.01); *G06F 2203/048* (2013.01);
(Continued)

(58) Field of Classification Search
CPC .......... G06F 3/011; G06F 3/012; G06F 3/013; G06F 3/017; G06F 3/0481;
(Continued)

(56) References Cited

U.S. PATENT DOCUMENTS 7,728,852 B2 * 6/2010 Suzuki ................ G06F 3/03542
345/632
2011/0279397 A1 * 11/2011 Rimon .................... G06F 3/048
345/173
(Continued)

FOREIGN PATENT DOCUMENTS

JP 2005-293142 A 10/2005
JP 2005322108 A 11/2005
(Continued)

OTHER PUBLICATIONS

Van Veldhuizen Michiel et al: "The Effect of Semi-Transparent and Interpenetrable Hands on Object Manipulation in Virtual Reality", IEEE Access, IEEE, Jan. 11, 2021, pp. 17572-17583, vol. 9, USA.
(Continued)

*Primary Examiner* — Mihir K Rayan
(74) *Attorney, Agent, or Firm* — Paratus Law Group, PLLC

(57) ABSTRACT

In order to accomplish the above-mentioned objective, a display control apparatus according to an embodiment of the present technology includes a control unit. The control unit controls, on the basis of a viewpoint of a user, a position of an operating part of the user, and a position of a virtual object, a display format of at least a portion of the operating part. Accordingly, it is possible to provide high-quality viewing experience. Moreover, when approaching the virtual object which is the operation target and operating the virtual object, the transparency of the operating part is controlled, such that the operation target can be carefully checked. Accordingly, operation time and operation mis-
(Continued)

takes can be reduced. Moreover, the display format is controlled on the basis of the distance between the operating part and the operation target, such that a distance to the operation target can be accurately grasped.

14 Claims, 19 Drawing Sheets

(52) U.S. Cl.
CPC .............. *G06F 2203/04801* (2013.01); *G06F 2203/04802* (2013.01); *G06F 2203/04804* (2013.01)

(58) Field of Classification Search
CPC ............... G06F 3/04815; G06F 3/0484; G06F 3/04845; G06F 3/147; G06F 2203/048; G06F 2203/04801; G06F 2203/04802; G06F 2203/04804; G09G 5/026
See application file for complete search history.

(56) References Cited

U.S. PATENT DOCUMENTS

2012/0113223 A1* 5/2012 Hilliges .................. G06F 3/011 348/46
2012/0206452 A1* 8/2012 Geisner ................... G06F 3/013 345/419
2012/0249741 A1 10/2012 Maciocci
2014/0104274 A1* 4/2014 Hilliges .................. G06F 3/011 345/424
2014/0240260 A1* 8/2014 Park ...................... G06F 3/0488 345/173
2017/0162177 A1 6/2017 Lebeck
2017/0365100 A1* 12/2017 Walton .................. G06T 19/006
2018/0040169 A1* 2/2018 Nakagawa ................ G06T 5/77
2018/0068476 A1* 3/2018 Ono .................... G06F 3/04815
2018/0108325 A1* 4/2018 Schwarz ................ G06T 11/60
2018/0260024 A1* 9/2018 Maltz ................... G02B 27/017

FOREIGN PATENT DOCUMENTS

| | | | |
|---|---|---|---|
| JP | 2012-155678 | A | 8/2012 |
| JP | 2013105330 | A | 5/2013 |
| JP | 2015127976 | A | 7/2015 |
| JP | 2016192122 | A | 11/2016 |
| JP | 2018-022292 | A | 2/2018 |
| JP | 2018-063567 | A | 4/2018 |
| JP | 2019095936 | A | 6/2019 |
| JP | 2021002290 | A | 1/2021 |
| WO | WO 2018/230160 | A1 | 12/2018 |
| WO | WO-2021001894 | A1 | 1/2021 |

OTHER PUBLICATIONS

Volkert Buchmann et al: "Interaction with partially transparent hands and objects", Advances in Ontologies, Australian Computer Society, Inc, Jan. 30, 2005, pp. 17-20, Australia.

* cited by examiner

A

B

C

A

B

A

B

DISPLAY CONTROL APPARATUS, DISPLAY CONTROL METHOD, AND PROGRAM

CROSS REFERENCE TO PRIOR APPLICATION

This application is a National Stage Patent Application of PCT International Patent Application No. PCT/JP2022/039828 (filed on Oct. 26, 2022) under 35 U.S.C. § 371, which claims priority to Japanese Patent Application No. 2021-191695 (filed on Nov. 26, 2021), which are all hereby incorporated by reference in their entirety.

TECHNICAL FIELD

The present technology relates to a display control apparatus, a display control method, and a program that can be applied to display control of virtual reality (VR), augmented reality (AR), and the like.

BACKGROUND ART

A display system described in Patent Literature 1 determines a virtual target object on the basis of a relationship between a display position and a specified position which are defined with respect to a virtual object in a photographic image and changes an image of the virtual target object (paragraphs [0045] to [0061], FIGS. 5 and 6, etc. of Patent Literature 1).

CITATION LIST

Patent Literature

Patent Literature 1: Japanese Patent Application Laid-open No. 2012-155678

DISCLOSURE OF INVENTION

Technical Problem

As described above, it is desirable to provide a technology capable of providing high-quality viewing experience with respect to display control in a virtual space.

In view of the above-mentioned circumstances, it is an objective of the present technology to provide a display control apparatus, a display control method, and a program which are capable of providing high-quality viewing experience.

Solution to Problem

In order to accomplish the above-mentioned objective, a display control apparatus according to an embodiment of the present technology includes a control unit.

The control unit controls, on the basis of a viewpoint of a user, a position of an operating part of the user, and a position of a virtual object, a display format of at least a portion of the operating part.

In this display control apparatus, the display format of at least the portion of the operating part is controlled on the basis of the viewpoint of the user, the position of the operating part of the user, and the position of the virtual object. Accordingly, it is possible to provide high-quality viewing experience.

The display format may include at least one of transparency, luminance, enlargement, reduction, or highlighted display of the operating part or superimposition of the virtual object.

The control unit may increase transparency of at least a portion of the operating part on the basis of a distance between the operating part and the virtual object.

The control unit may increase transparency of at least a portion of the operating part on the basis of a velocity of the operating part in a contact state with the virtual object.

The control unit may increase transparency of at least a portion of the operating part on the basis of a size of the operating part.

The operating part may include feature information indicating a feature of the user. In this case, the control unit may increase transparency of at least a portion of the operating part other than the feature information.

The control unit may increase transparency of at least a portion of the operating part on the basis of a distance between the operating part and the virtual object and highlight and display an outline of a site of the operating part, which has increased transparency.

The control unit may highlight and display a contact position of the operating part with the virtual object and increase transparency of at least a portion of the operating part other than the contact position.

The display control apparatus may further include a suppression unit that suppresses control of the display format on the basis of a predetermined operation executed by the operating part.

The display control apparatus may further include a first determining unit that determines, on the basis of the viewpoint of the user, the position of the operating part, and the position of the virtual object, whether or not the user is able to visually recognize the virtual object.

The first determining unit may determine, in a case where the operating part is in contact with the virtual object and the operating part is positioned between the viewpoint of the user and the virtual object, that the user is unable to visually recognize the virtual object.

The display control apparatus may further include a display control unit that controls a display format of at least a portion of the other virtual object on the basis of the viewpoint of the user, the position of the operating part, a position of a target virtual object to be operated by the operating part, and a position of another virtual object other than the target virtual object.

The display format may include transparency of the other virtual object.

The display control apparatus may further include a second determining unit that determines whether or not the user is able to visually recognize a contact position of the operating part with the target virtual object on the basis of the viewpoint of the user, the position of the operating part, the position of the target virtual object, and the position of the other virtual object.

A display control method according to an embodiment of the present technology is a display control method executed by a computer system and includes controlling, on the basis of a viewpoint of a user, a position of an operating part of the user, and a position of a virtual object, a display format of at least a portion of the operating part.

A program according to an embodiment of the present technology causes a computer system to execute the following step.

A step of controlling, on the basis of a viewpoint of a user, a position of an operating part of the user, and a position of a virtual object, a display format of at least a portion of the operating part.

MODE(S) FOR CARRYING OUT THE INVENTION

Hereinafter, embodiments according to the present technology will be described with reference to the drawings.

Figure 1:
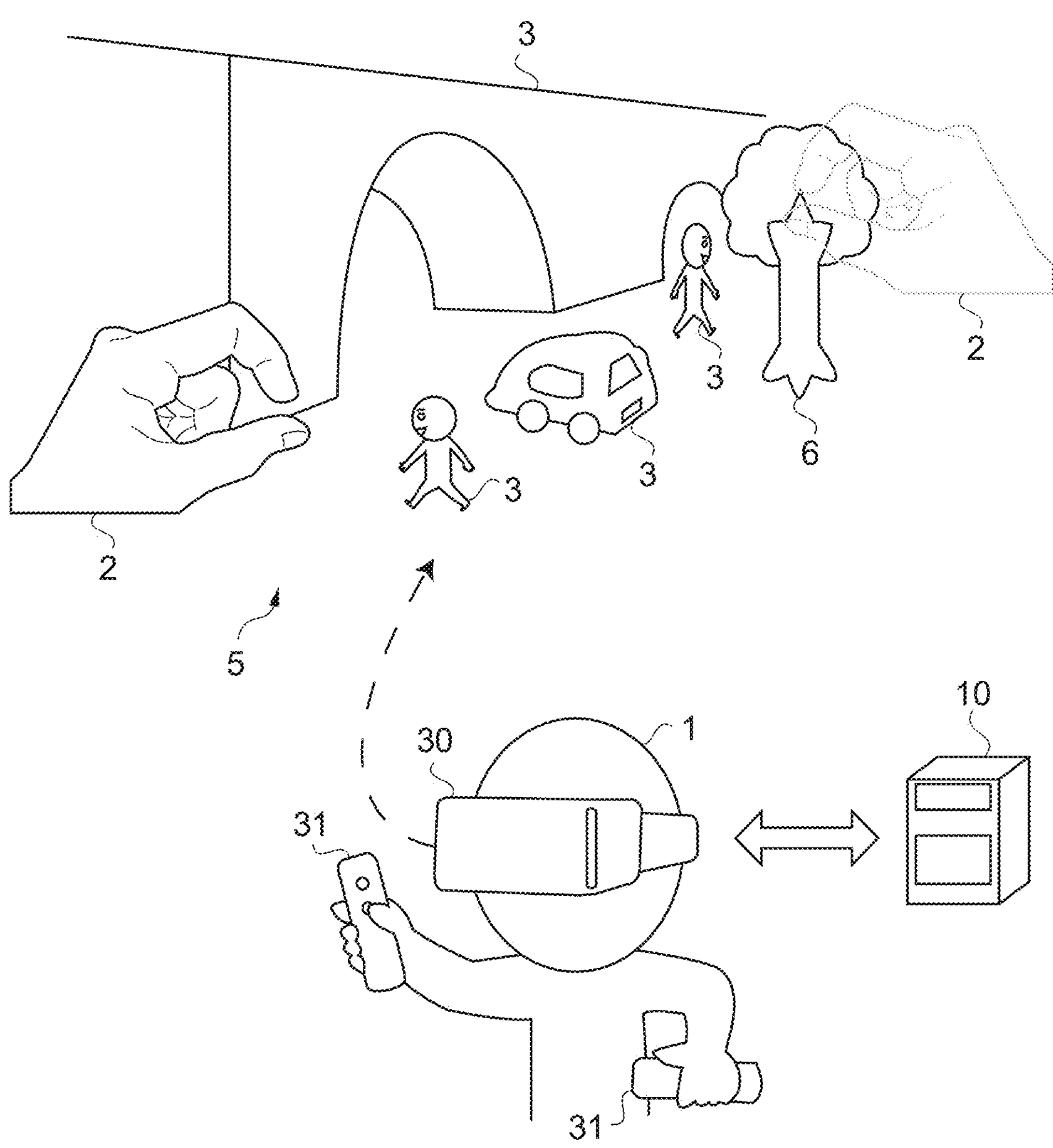
FIG. 1A view schematically showing the overview of a display control apparatus.

FIG. 1 is a view schematically showing the overview of a display control apparatus 10 according to the present technology.

The display control apparatus 10 controls a display format of an operating part 2 of a user 1 in a virtual space 5. In the present embodiment, a head mounted display (HMD) 30 such as a VR headset, a controller 31, and a sensor unit (not shown) are used for the display control apparatus 10. As a matter of course, an optical see-through-type AR, a video see-through-type AR, or the like may be used.

For example, the HMD 30 allows the user 1 to view a virtual object 3 (virtual space 5) and the operating part 2 and has various sensors capable of detecting an attitude of the user 1, positions of the eyes, a line of eyesight, and the like. Moreover, for example, the controller 31 is used for an operation of the operating part 2 and has an inertial measurement apparatus (IMU) or the like that detects acceleration, angular velocity, and the like associated with an operation of the user 1.

The user 1 is able to operate the virtual object 3 arranged in the virtual space 5 via the operating part 2. The operating part 2 refers to one that is operated by the user 1 and capable of executing a predetermined operation on the virtual object 3.

For example, a hand in the virtual space 5 which is obtained by a hand tracking function in a VR as in FIG. 1, the controller 31 held by the user 1, or a hand of the user 1 in the virtual space in an AR can be the operating part 2.

Otherwise, the hand (operating part) in the virtual space 5 may be displayed (superimposed) in a shape suitable for a predetermined motion of a pencil, a trowel, or the like or the controller 31 or another object may be displayed. Moreover, for example, in a case where a motion such as shooting the virtual object 3 can be done by tracking a motion of a foot of the user 1, the foot may be included in the operating part.

It should be noted that in a case where the user 1 holds a virtual object such as a pencil and writes on another virtual object, the pencil as the virtual object may also be included in the operating part. That is, also in a case where the user 1 indirectly operates the virtual object via the virtual object, the virtual object directly operated by the user 1 may be included in the operating part.

In the present embodiment, the display control apparatus 10 controls the display format of at least the portion of the operating part 2 on the basis of a viewpoint of the user 1, a position of the operating part 2, and a position of the virtual object 3. The display format includes at least one of transparency, luminance, enlargement, reduction, highlighted display, or superimposition of the virtual object.

For example, in FIG. 1, due to a positional relationship between the viewpoint of the user 1, the operating part 2 (right hand), and the virtual object 6 (hereinafter, referred to as a target virtual object) operated by the operating part 2, the user 1 cannot visually recognize a portion of a target virtual object 6. In this case, the display control apparatus 10 increases the transparency of the operating part 2. A control example of the display format will be described later with reference to FIGS. 3 to 10.

Figure 2:
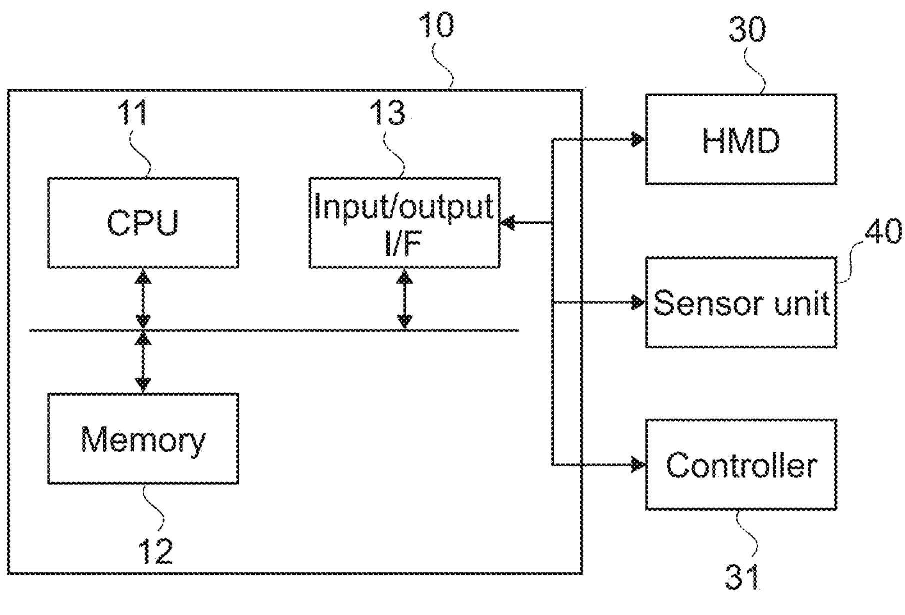
FIG. 2A block diagram showing a configuration example of the display control apparatus.
Figure 2:
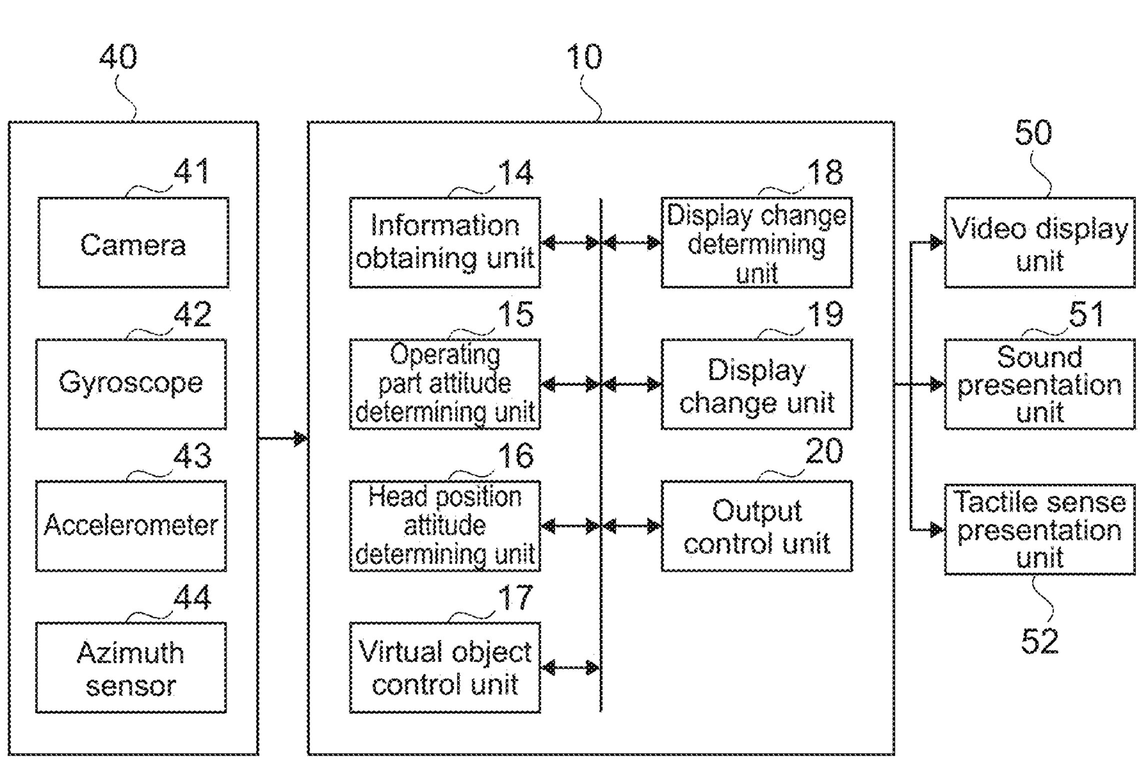

FIG. 2 is a block diagram showing a configuration example of the display control apparatus 10 shown in FIG. 1. A of FIG. 2 is a block diagram showing a hardware configuration example of the display control apparatus 10. B of FIG. 2 is a block diagram showing a functional configuration example of the display control apparatus 10.

As shown in A of FIG. 2, the display control apparatus 10 includes a CPU 11, a memory 12, and an input/output I/F 13.

The input/output I/F 13 receives various types of information related to the user 1 obtained from a sensor unit 40 and the operation information related to the controller 31 and outputs a video, a sound, and a tactile sense to the HMD 30 and the controller 31.

The HMD 30 may be provided with various functions for the user to experience virtual reality. For example, the HMD 30 may be provided with any display (video display unit 50) using liquid-crystal, electro-luminescence (EL), or the like, headphones (sound presentation unit 51) arranged covering the user's left and right ears, a stereo camera capable of imaging a real space on the front side of the user 1, and the like.

The controller 31 outputs a motion (movement or rotation) of the hand of the user 1 and operation information such as a button operation to the input/output I/F 13. Moreover, the controller 31 functions as a tactile sense presentation unit 52 that has an actuator and the like and presents a tactile sense to the user 1.

The sensor unit 40 recognizes positions of the user's hand and fingers, a line of eyesight of the user, a tilt, and the like. In the present embodiment, as shown in B of FIG. 2, the sensor unit 40 has a camera 41 including a RGB camera, a depth camera, and the like, a gyroscope 42, an accelerometer 43, and an azimuth sensor 44. It should be noted that the sensor unit 40 may be mounted on the HMD 30 or the controller 31 or various sensors may be attached to the body of the user 1 and a surrounding environment such as a wall and a pole so that they may function as the sensor unit 40. Moreover, the various sensors may be singular or plural.

Moreover, as shown in B of FIG. 2, the display control apparatus 10 includes an information obtaining unit 14, an operating part attitude determining unit 15, a head position attitude determining unit 16, a virtual object control unit 17, a display change determining unit 18, a display change unit 19, and an output control unit 20.

The information obtaining unit 14 obtains various types of information related to the user, which are obtained from the sensor unit 40, and the operation information related to the controller 31.

The operating part attitude determining unit 15 determines an attitude of the operating part. For example, positions of bones of the user's fingers are obtained from the sensor information obtained by a depth sensor and the like and position attitude information of the hand and fingers are determined. It should be noted that a method of determining the attitude of the operating part is not limited, and may be determined from a contact sensor mounted on the controller 31.

The head position attitude determining unit 16 determines a position of the user's head. For example, the position of the user's head is obtained on the basis of sensor information obtained from visual simultaneous localization and mapping (SLAM) or the like using the camera 41 and position attitude information of the head is determined.

The virtual object control unit 17 performs control on the virtual object. For example, the virtual object control unit 17 controls the position and the attitude of the virtual object. Otherwise, various types of control such as control in a case where an operation, e.g., moving, arranging, or removing the virtual object has been performed by the operating part, enlargement and reduction of the virtual object, control on the virtual object including motion information, e.g., indicating that a tree is dropping flowers, and drawing a shadow with respect to a light source may be performed.

The display change determining unit 18 determines whether or not to change display of the operating part or the virtual object on the basis of position attitude information of the user's head, the operating part, and the virtual object. In the present embodiment, the display change determining unit 18 determines whether or not the user is able to visually recognize the virtual object on the basis of the viewpoint of the user, the position of the operating part, and the position of the virtual object.

Moreover, on the basis of the viewpoint of the user, the position of the operating part, the position of the target virtual object, and the position of the other virtual object other than the target virtual object, the display change determining unit 18 determines whether or not the user is able to visually recognize a contact position of the operating part with the target virtual object.

It should be noted that "able to visually recognize" is a state in which the user can easily see the virtual object or the contact position. As a matter of course, in a case where the virtual object or the contact position is completely visible, it is considered as being "able to visually recognize". On the contrary, in a case where the virtual object or the contact position is completely hidden by the operating part or the other virtual object, it is considered as being "unable to visually recognize". In a case where a portion of the virtual object or the contact position is hidden, a determination as to "able to visually recognize" may be arbitrarily set. For example, in a case where 50% of the virtual object or the contact position is hidden when viewed from the user, it may be determined as being "unable to visually recognize".

In the present embodiment, the display change determining unit 18 determines it as being "unable to visually recognize" in a case where the operating part or the other virtual object is positioned between the viewpoint of the user and the virtual object, i.e., in a case where the operating part or the other virtual object is positioned on the line of eyesight of the user. Moreover, in the present embodiment, the display change determining unit 18 determines it as being "unable to visually recognize" in a case where the operating part and the virtual object are in contact with each other on the line of eyesight of the user. For example, in a case where the operating part comes into contact with a back surface of the virtual object while the user is seeing a surface of the virtual object, it is determined as being "able to visually recognize".

The display change unit 19 controls, on the basis of the viewpoint of the user, the position of the operating part, and the position of the virtual object, a display format of at least a portion of the operating part. In the present embodiment, a display format of at least a portion of the operating part is controlled on the basis of a determination result of the display change determining unit 18.

Moreover, the display change unit 19 suppresses control of the display format on the basis of a predetermined motion executed by the operating part. For example, in a case where a motion of rapidly moving the operating part has been done n-times, the control of the display format is suppressed. Moreover, for example, in a case where a predetermined hand sign of, for example, raising the middle finger and the little finger has been done, the control of the display format may be suppressed.

Moreover, on the basis of the viewpoint of the user, the position of the operating part, the position of the target virtual object, and the position of the other virtual object other than the target virtual object, the display change unit 19 controls a display format of at least a portion of the other virtual object. In the present embodiment, a display format of at least a portion of the other virtual object is controlled on the basis of a determination result of the display change determining unit 18.

The output control unit 20 controls the output of a video, a sound, a tactile sense, and the like, which are generated from the virtual space, the virtual object, and the controller. For example, a tactile sense signal expressing an impact when the operating part is in contact with the virtual object is output to the tactile sense presentation unit 52. Moreover, for example, an audio signal when virtual objects located far away from the user collide with each other is output to the sound presentation unit 51 on the basis of a distance from the user. Moreover, a video signal according to such an example is output to the video display unit 50.

It should be noted that in the present embodiment, the display change determining unit 18 functions as a first determining unit that determines, on the basis of the viewpoint of the user, the position of the operating part, and the position of the virtual object, whether or not the user is able to visually recognize the virtual object and a second determining unit that determines whether or not the user is able to visually recognize a contact position of the operating part with the target virtual object on the basis of the viewpoint of the user, the position of the operating part, the position of the target virtual object, and the position of the other virtual object.

It should be noted that in the present embodiment, the display change unit 19 functions as a control unit that controls, on the basis of a viewpoint of a user, a position of an operating part of the user, and a position of a virtual object, a display format of at least a portion of the operating part, a suppression unit that suppresses control of the display format on the basis of a predetermined motion executed by the operating part, and a display control unit that controls a display format of at least a portion of the other virtual object on the basis of the viewpoint of the user, the position of the operating part, a position of a target virtual object to be operated by the operating part, and a position of another virtual object other than the target virtual object.

Figure 3:
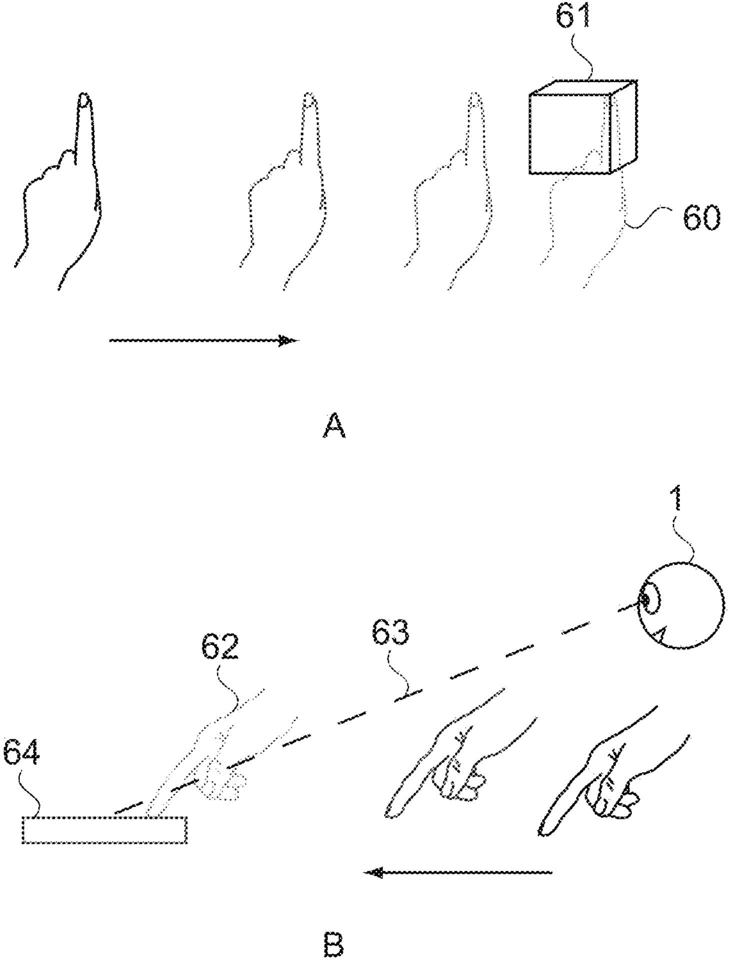
FIG. 3A schematic view showing a control example of a display format.
Figure 3:
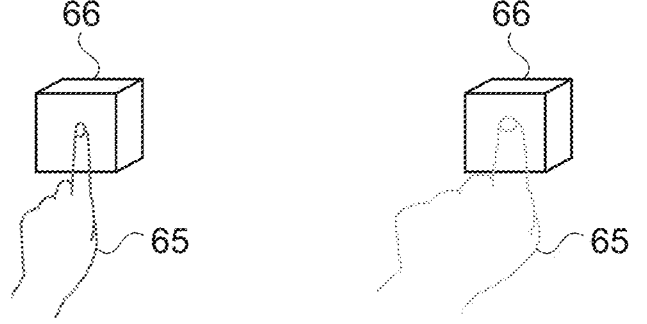

FIG. 3 is a schematic view showing a control example of the display format. It should be noted that in FIGS. 3 to 10, in a case where any other virtual object than the target virtual object is not shown, the target virtual object will be referred to as a virtual object.

As a flow controlled by the display format, the information obtaining unit 14 obtains the viewpoint of the user, the position of the operating part (controller), and the position of the virtual object. The display change determining unit 18 determines whether or not to change the display format on the basis of an obtained positional relationship between the viewpoint, the operating part, and the virtual object. In a case where the determination result is YES, the display change unit 19 changes the display format of the operating part or the other virtual object.

As shown in A of FIG. 3, the display change unit 19 increases transparency of the operating part 60 on the basis of a distance between an operating part 60 and a virtual object 61. In A of FIG. 3, the transparency of the operating part 60 increases as the distance between the operating part 60 and the virtual object 61 decreases.

As shown in B of FIG. 3, the display change unit 19 increases the transparency of the operating part 62 in a case where an operating part 62 is positioned on a line of eyesight 63 of the user 1. Moreover, also in B of FIG. 3, the transparency of the operating part 62 may be controlled on the basis of a distance between the operating part 62 and a virtual object 64. In this case, weighting for the transparency control depending on the distance between the operating part 62 and the virtual object 64 and the transparency control in a case where the operating part 62 is positioned between the viewpoint of the user 1 and the virtual object 64 may be arbitrarily set.

For example, a setting in which the transparency of the operating part 62 becomes closer to 50% as the operating part 62 and the virtual object 64 approach each other and a setting in which the transparency of the operating part 62 is set to 90% in a case where the operating part 62 is positioned between the viewpoint of the user 1 and the virtual object 64 may be set.

It should be noted that a method of obtaining the user's line of eyesight is not limited. For example, the user's line of eyesight may be obtained by eye tracking or may be obtained by emitting a ray in a perpendicular direction from the head.

In C of FIG. 3, the display change unit 19 increases the transparency of the operating part on the basis of a size (thickness) of the operating part. As shown in C of FIG. 3, the transparency increases as an operating part 65 becomes larger. That is, it can also be said that the display format is controlled on the basis of how much degree a virtual object 66 is hidden by the operating part 65 (easiness to visually recognize).

Figure 4:
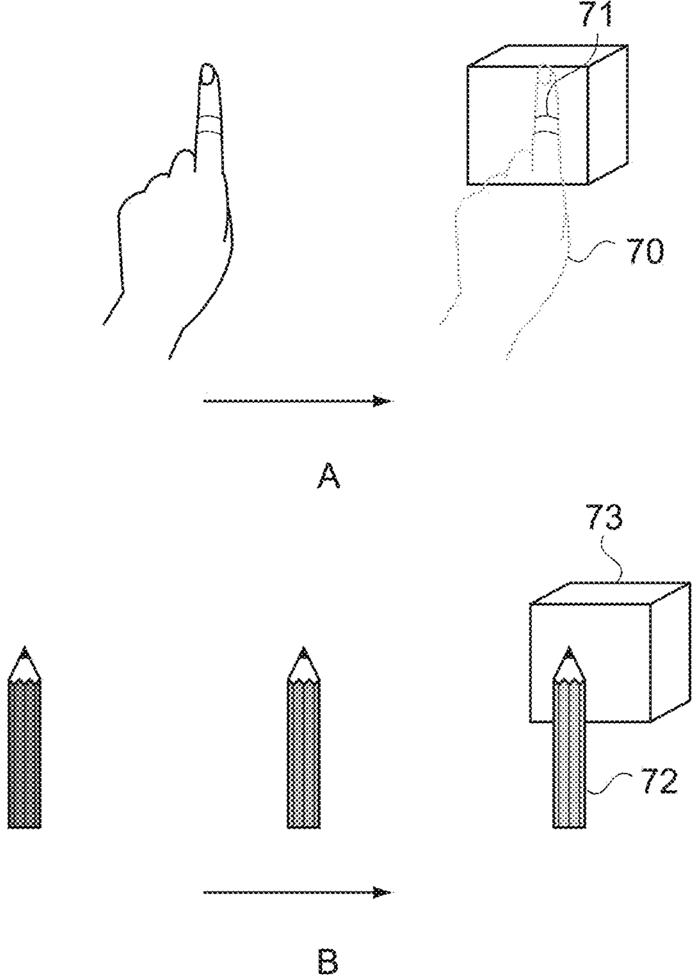
FIG. 4A schematic view showing a control example of the display format.

FIG. 4 is a schematic view showing a control example of the display format.

In A of FIG. 4, an operating part 70 includes feature information indicating feature(s) of the user. For example, the feature information includes information associated with the user, e.g., accessories such as rings, nails, a tattoo, medical items such as a bandage, and a scar, and a virtual object (layer) superimposed on the operating part, such as a hand, in the virtual space.

As shown in A of FIG. 4, the display change unit 19 increases the transparency of the operating part 70 other than a ring 71 which is the feature information. Accordingly, an item to be a symbol of the user (operator) can be left, and it prevents a sensation of operating the user's hand from being impaired.

In B of FIG. 4, an operating part 72 has a shape mimicking a pencil and luminance is controlled as control of the display format. For example, the display change unit 19 controls the luminance of the operating part 72 on the basis of a distance between the operating part 72 and a virtual object 73. As shown in B of FIG. 4, the operating part 72 increases in luminance as it approaches the virtual object 73.

It should be noted that the control of the display format may be arbitrarily set. For example, the display format of the operating part may be controlled on the basis of velocity of the operating part in a state in which the operating part and the virtual object are in contact. For example, in a case where the operating part moves rapidly, the situation where the user does not carefully check the operation (contact position of the virtual object) is envisaged, and therefore the transparency may decrease. Moreover, for example, in a case where the operating part moves slowly, the situation where the user wishes carefully check the operation is envisaged, and therefore the transparency may increase.

Figure 5:
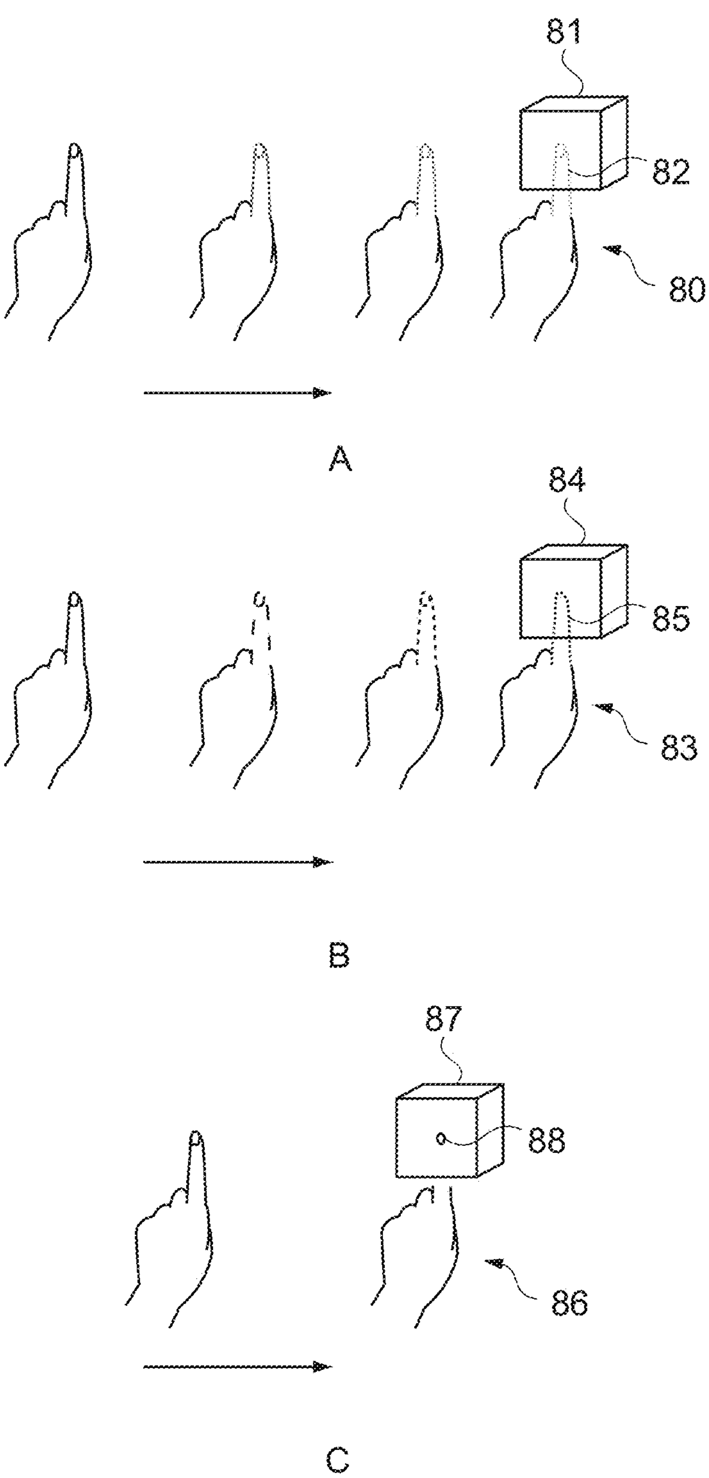
FIG. 5A schematic view showing a control example of the display format.

FIG. 5 is a schematic view showing a control example of the display format. In FIG. 5, the display format of a portion of the operating part is controlled. For example, the display format of only the finger (e.g., the index finger) that attempts to operate the virtual object, not the entire hand that is the operating part, is controlled. In this case, the sensor unit 40 may recognize a gesture of raising the index finger. Moreover, for example, in a case where the index finger is closest to the virtual object among the other fingers, the index finger may be selected as the operating part (control target of the display format).

As shown in A of FIG. 5, the display change unit 19 increases the transparency of at least a portion of an operating part 80 on the basis of a distance between the operating part 80 and a virtual object 81. In A of FIG. 5, when viewed from the viewpoint of the user, the transparency of an index finger 82 overlapping the virtual object increases.

In B of FIG. 5, the display change unit 19 increases the transparency of at least a portion of the operating part 83 on the basis of a distance between an operating part 83 and a virtual object 84 and highlights and displays an outline of a higher-transparency part of the operating part 83. For example, as shown in B of FIG. 5, the display change unit 19 increases the transparency of the index finger as a distance between the operating part 83 and the virtual object 84 decreases. Moreover, the display change unit 19 highlights and displays an outline 85 of a higher-transparency index finger.

It should be noted that a control method for the highlighted display of the outline is not limited. For example, the outline may be blinked or the color may change. Moreover, the transparency of the outline may be controlled in accordance with the transparency of the operating part. For example, the transparency of the outline may be controlled to decrease as the transparency of the operating part increases.

In C of FIG. 5, the display change unit 19 highlights and displays a contact position 88 of an operating part 86 with a virtual object 87 and increases the transparency of at least a portion of the operating part 86 other than the contact position 88 highlighted and displayed. For example, as shown in C of FIG. 5, in a case where the operating part 86 comes into contact with the virtual object 87, the contact position is highlighted and displayed. It should be noted that the highlighted display of the contact position is not limited, and any highlighted display such as blink, color, or pattern may be set.

Moreover, the display format may be controlled on the basis of the size (thickness), the velocity, and the like of the operating part other than the distance between the operating part and the virtual object. Moreover, the highlighted display level may change on the basis of the size of the operating part or the contact position. Accordingly, it is possible to realize the contact surface, which allows easy operation.

Figure 6:
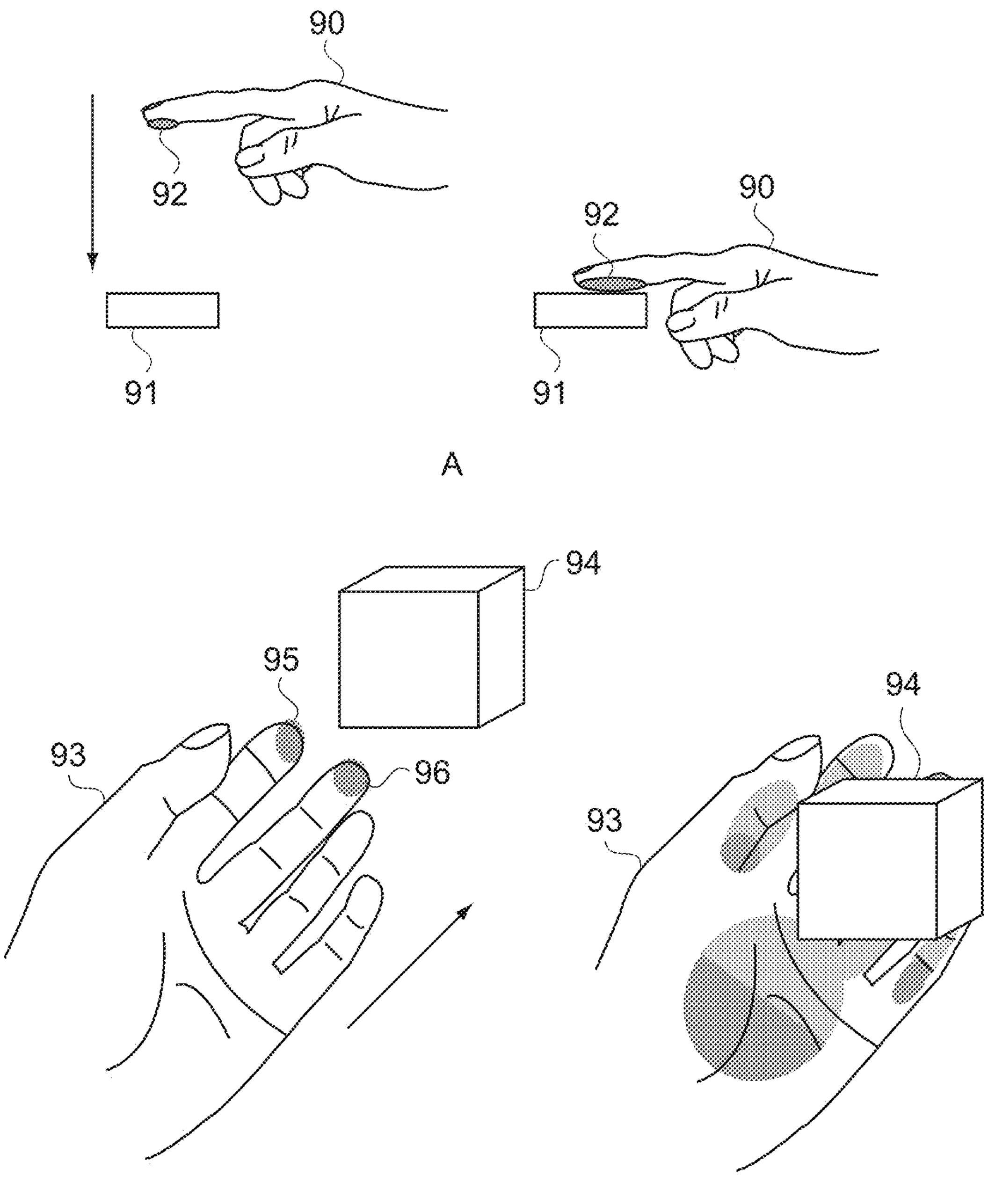
FIG. 6A schematic view showing a control example of the display format.

FIG. 6 is a schematic view showing a control example of the display format.

In FIG. 6, the display change unit 19 controls luminance of at least a portion of an operating part 90 on the basis of a distance between the operating part 90 and a virtual object 91. For example, in A of FIG. 6, a higher-luminance region 92 becomes larger as the distance between the operating part 90 and the virtual object 91 decreases.

In B of FIG. 6, in a case where a distance between a hand 93 that is the operating part and a virtual object 94 decreases to be within a predetermined distance, luminance of an index finger 95 and a middle finger 96 positioned within the predetermined distance increases. Moreover, in B of FIG. 6, the luminance increases as a distance between an operating part 93 and the virtual object 94 decreases. For example, as shown in B of FIG. 6, in a case where the hand 93 approaches the virtual object 94, luminance level and a higher-luminance region are controlled on the basis of a distance between each part of the hand 93 and the virtual object 94.

It should be noted that control, e.g., a color change and/or superimposition of patterns may be performed other than the luminance. Moreover, an outline of a higher-luminance region may be highlighted and displayed. Accordingly, it is possible to intuitively realize how much closer to the virtual object the operating part is.

Figure 7:
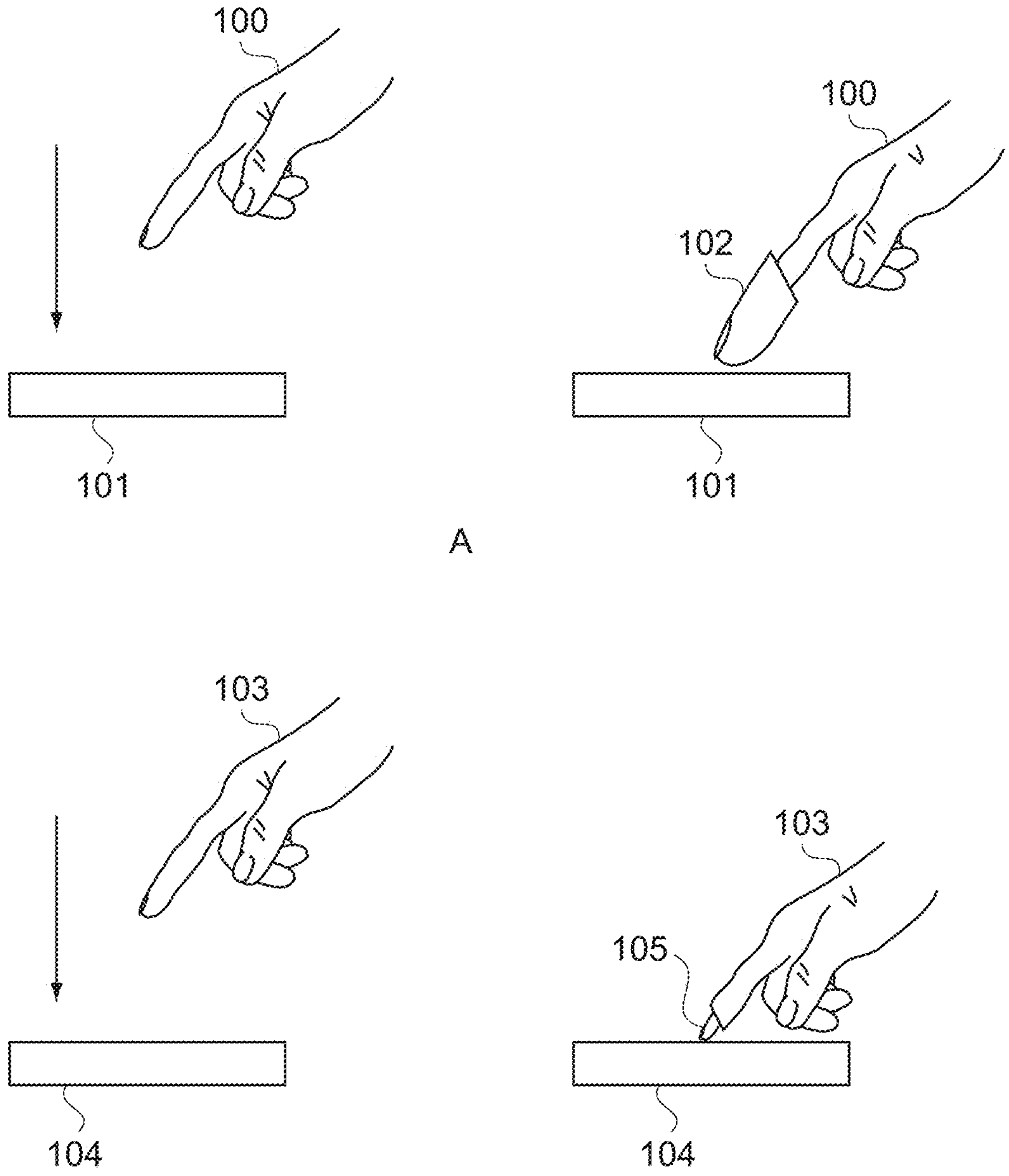
FIG. 7A schematic view showing a control example of the display format.

FIG. 7 is a schematic view showing a control example of the display format.

In FIG. 7, the display change unit 19 controls an enlargement and reduction scale of at least a portion of the operating part on the basis of the distance between the operating part and the virtual object.

In A of FIG. 7, the display change unit 19 increases an enlargement scale of a finger 102 as a distance between a hand 100 that is the operating part and a virtual part 101 decreases. Moreover, in B of FIG. 7, the display change unit 19 increases a reduction rate of a finger 105 as a distance between a hand 103 that is the operating part and a virtual part 104.

Accordingly, in a case where the enlargement scale increases, the work efficiency is improved because of the increased size of the operating part. Moreover, in a case where the reduction rate is higher, finer work can be performed.

It should be noted that in a case where the display format is controlled, a message or the like presents to the user the fact that the display format, e.g., "the display being changed", is controlled may be displayed.

Figure 8:
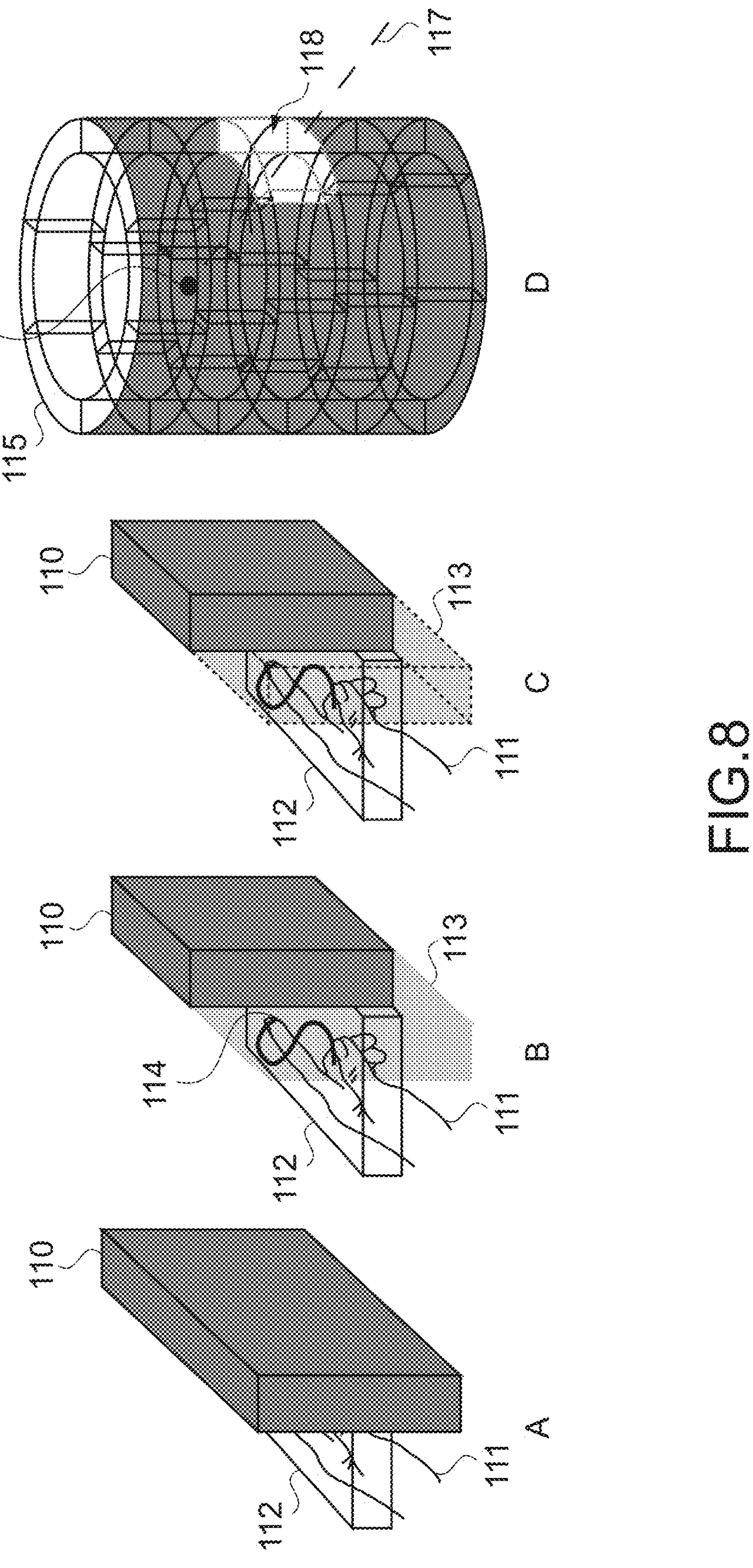
FIG. 8A schematic view showing a control example of a display format of another virtual object.

FIG. 8 is a schematic view showing a control example of a display format of another virtual object.

As shown in A of FIG. 8, the display change determining unit 18 determines that a contact position of an operating part 111 with a target virtual object 112 cannot be visually recognized due to another virtual object 110 from the viewpoint of the user. In this case, the display change unit 19 controls a display format of at least a portion of the other virtual object 110. In the present embodiment, the display change unit 19 controls transparency of the other virtual object 110.

For example, in B of FIG. 8, the transparency of a portion 113 of the other virtual object 110 positioned on the line of eyesight of the user increases. It should be noted that the line of eyesight of the user in FIG. 8 is a straight line connecting a contact position 114 with the viewpoint of the user.

Moreover, as shown in C of FIG. 8, an outline of the portion 113 where the transparency of the other virtual object 110 has been increased may be highlighted and displayed. It should be noted that the transparency of the entire other virtual object 110 may be uniformly increased or the transparency may be controlled on the basis of the distance to the line of eyesight of the user.

Otherwise, the display format of the other virtual object 110 may be controlled on the basis of the velocity of the operating part 111. For example, in a case where the operating part moves rapidly, the situation where the user does not carefully check the contact position of the target virtual object is envisaged, and therefore the transparency may be decreased. Moreover, for example, in a case where the operating part moves slowly, the situation where the user wishes to carefully check the operation is envisaged, the transparency may be increased.

It should be noted that depending on a shape such as an L-shape or a cylindrical shape and the like of the target virtual object, there is a possibility that the contact position cannot be visually recognized even in a case where it is a single target virtual object. In this case, the transparency of a portion of the target virtual object may be increased. That is, a portion of the target virtual object may be handled as the other virtual object.

For example, as shown in D of FIG. 8, the virtual object control unit 17 may subdivide a target virtual object 115. The transparency of a block 118 of the subdivided target virtual object 115, which is positioned within the predetermined distance from a line of eyesight 117 of the user that connects the viewpoint of the user with a contact position 116 may be increased.

Otherwise, transparency of a plurality of blocks may be controlled or the transparency of a half of the cylinder on the user's side may be controlled. It should be noted that the virtual object may be subdivided and arranged in the virtual space in advance or may be subdivided when the display change determining unit 18 determines that it is the situation as shown in D of FIG. 8.

Figure 9:
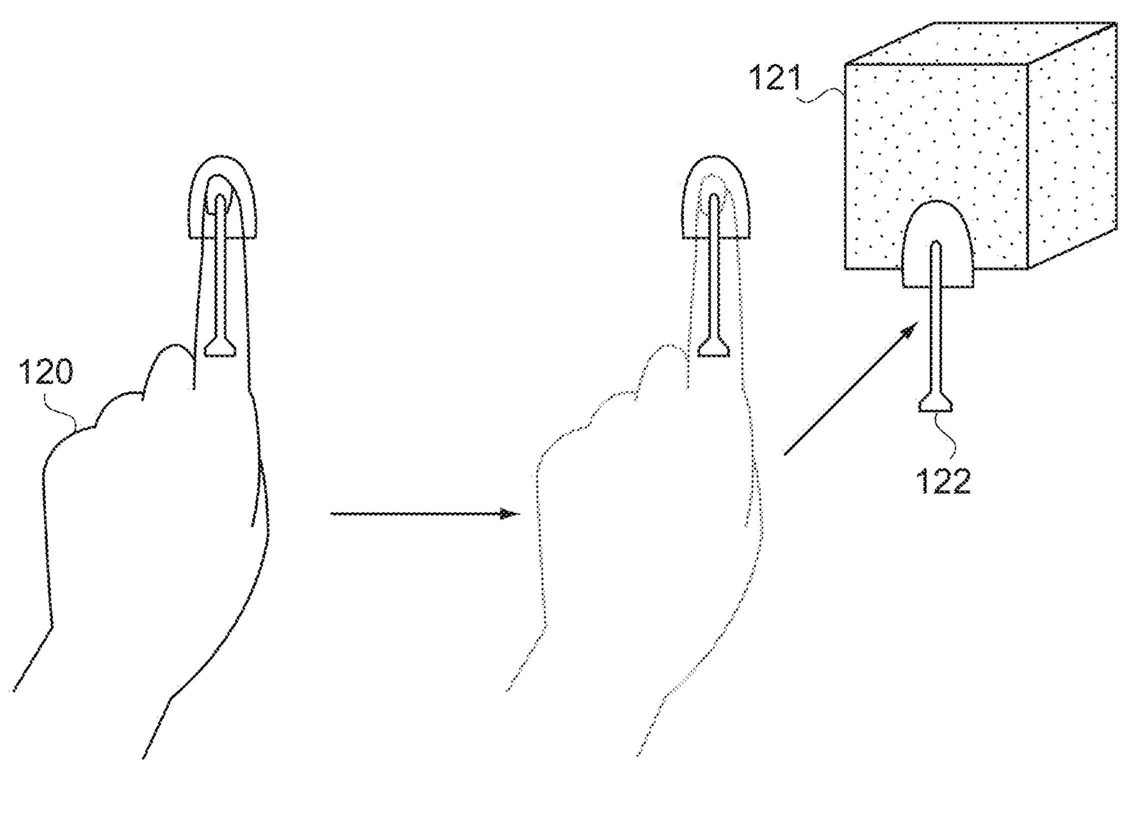
FIG. 9A schematic view showing another control example of a display format of an operating part.
Figure 9:
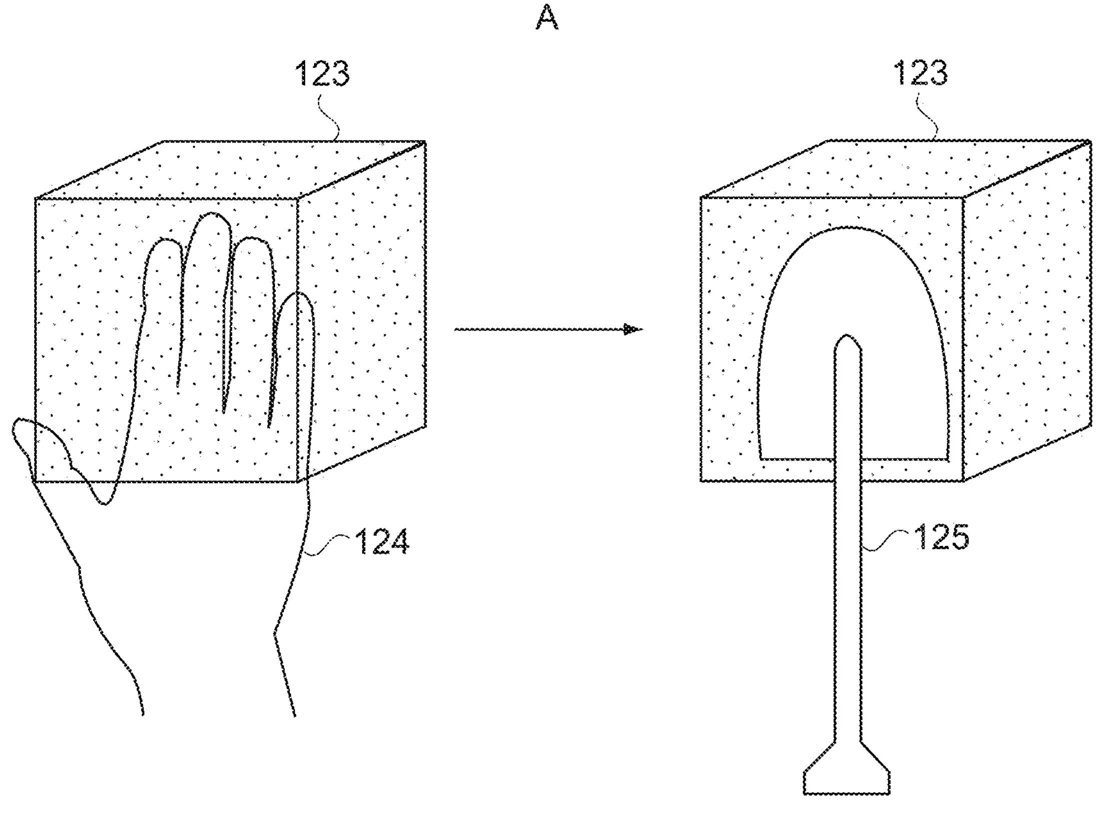
Figure 10:
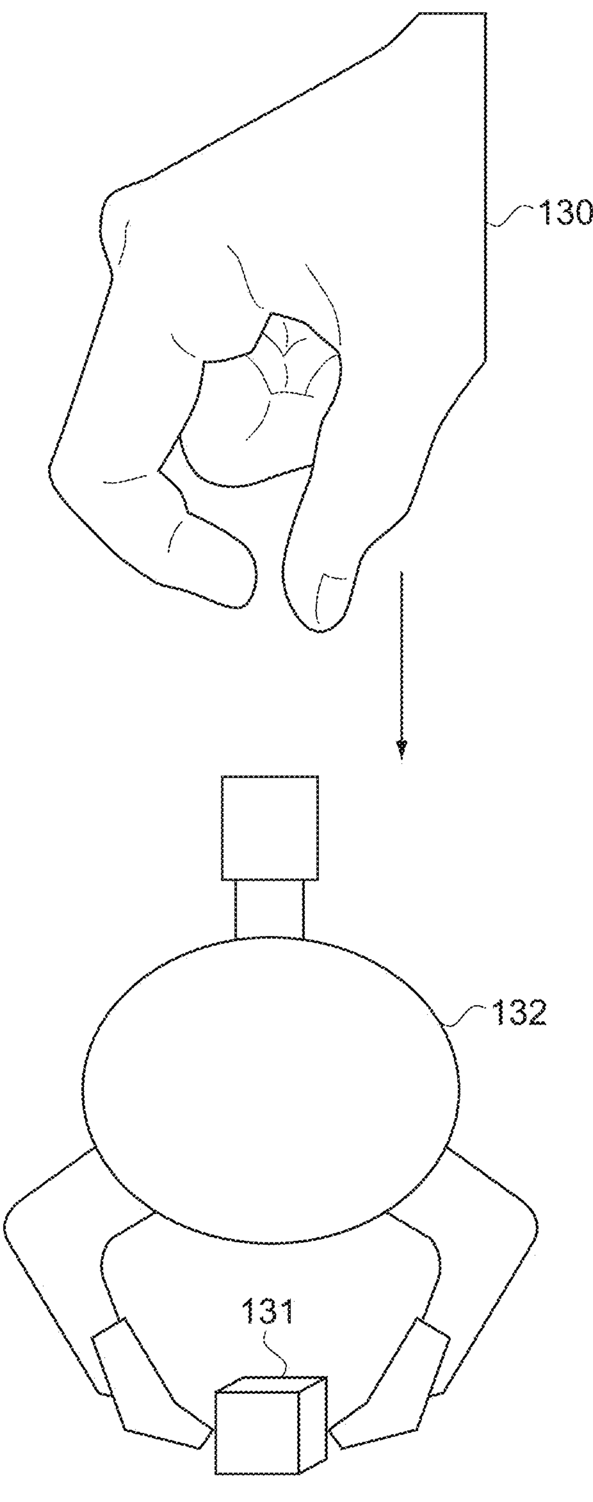
FIG. 10A schematic view showing another control example of the display format of the operating part.

FIGS. 9 and 10 are schematic views showing other control examples of the display format of the operating part.

In FIG. 9, the display change unit 19 controls the display of the operating part on the basis of information applied to the target virtual object. For example, a 3D model that changes as meta-information may be registered as the target virtual object and the operating part may be changed into the 3D model.

For example, in A of FIG. 9, an example in which the user uses an operating part 120 to perform a motion of digging a target virtual object 121 to which attribute information "sand" has been applied is shown. As shown in A of FIG. 9, the display change unit 19 controls to gradually change the operating part 120 into a trowel 122 on the basis of the distance between the operating part 120 and the target virtual object 121.

Moreover, as shown in B of FIG. 9, the size of the displayed 3D model may be controlled in accordance with the size (thickness) of an operating part 124 that executes an operation on a target virtual object 123. For example, in a case of executing an operation on the target virtual object 123 with four fingers, control may be performed to change into a trowel 125 larger than the trowel 122 changed with one finger.

In FIG. 10, the display change unit 19 controls the display of the operating part on the basis of the shape of the operating part. For example, as shown in FIG. 10, in a case where a hand 130 that is the operating part has a shape pinched by the index finger and the thumb finger, the display change unit 19 changes the hand 130 into a robot arm 132 when it comes into contact with a target virtual object 131.

Otherwise, when it comes into contact with the target virtual object, the hand may change into a trowel in a case where the hand does not have the shape pinched by the index finger and the thumb finger or may change into the robot arm in a case where it has the pinched shape.

Moreover, whether or not it is changed into a particular 3D model may be controlled on the basis of the velocity of the operating part. For example, in a case where the hand that is the operating part is slowly moving, the 3D model of the hand may be changed. Moreover, for example, in a case where the hand that is the operating part is rapidly moving, the change of the 3D model of the hand may be suppressed.

Moreover, the shape of the operating part for executing the predetermined motion and the 3D model suitable for the predetermined motion, which depend on the information applied to the target virtual object, may be registered. For example, when a closed hand that is the operating part comes closer to a rock that is the target virtual object, control may be performed to change into a 3D model mimicking a hammer for breaking the rock. It should be noted that while the operating part is changing into another 3D model, the operating part may be displayed in a translucent state.

That is, changing the object (3D model) of the operating part is also included in control of the display format. Accordingly, it facilitates the operation of the virtual object and it is possible to improve the usability, for example, reducing operation mistakes.

As described above, in the display control apparatus 10 according to the present embodiment, the display format of at least the portion of the operating part 2 is controlled on the basis of the viewpoint of the user 1, the position of the operating part 2, and the position of the virtual object 3. Accordingly, it is possible to provide high-quality viewing experience.

Conventionally, when the user moves the hand to the operation target in the AR or VR, feedback indicating how much closer it is necessary. Moreover, there has been a problem in that in a case of carefully operating the operation target with the hand in contact with the operation target, there is a portion where the operation target cannot be seen due to the controller or the virtual object.

In view of this, in the present technology, the display format of the operating part or the virtual object is controlled on the basis of the viewpoint of the user, the position of the operating part, and the position of the virtual object. In particular, when approaching the virtual object which is the operation target and operating the virtual object, the transparency of the operating part is controlled, such that the operation target can be carefully checked. Accordingly, operation time and operation mistakes can be reduced. Moreover, the display format is controlled on the basis of the distance between the operating part and the operation target, such that a distance to the operation target can be accurately grasped.

Other Embodiments

The present technology is not limited to the above-mentioned embodiment, and various other embodiments can be realized.

In the above-mentioned embodiment, the display control apparatus 10 functions by being connected to the HMD 30, the sensor unit 40, and the controller 31. The present technology is not limited thereto, and a configuration in which the HMD 30, the controller 31, and the sensor unit 40 are independent may be employed.

Figure 11:
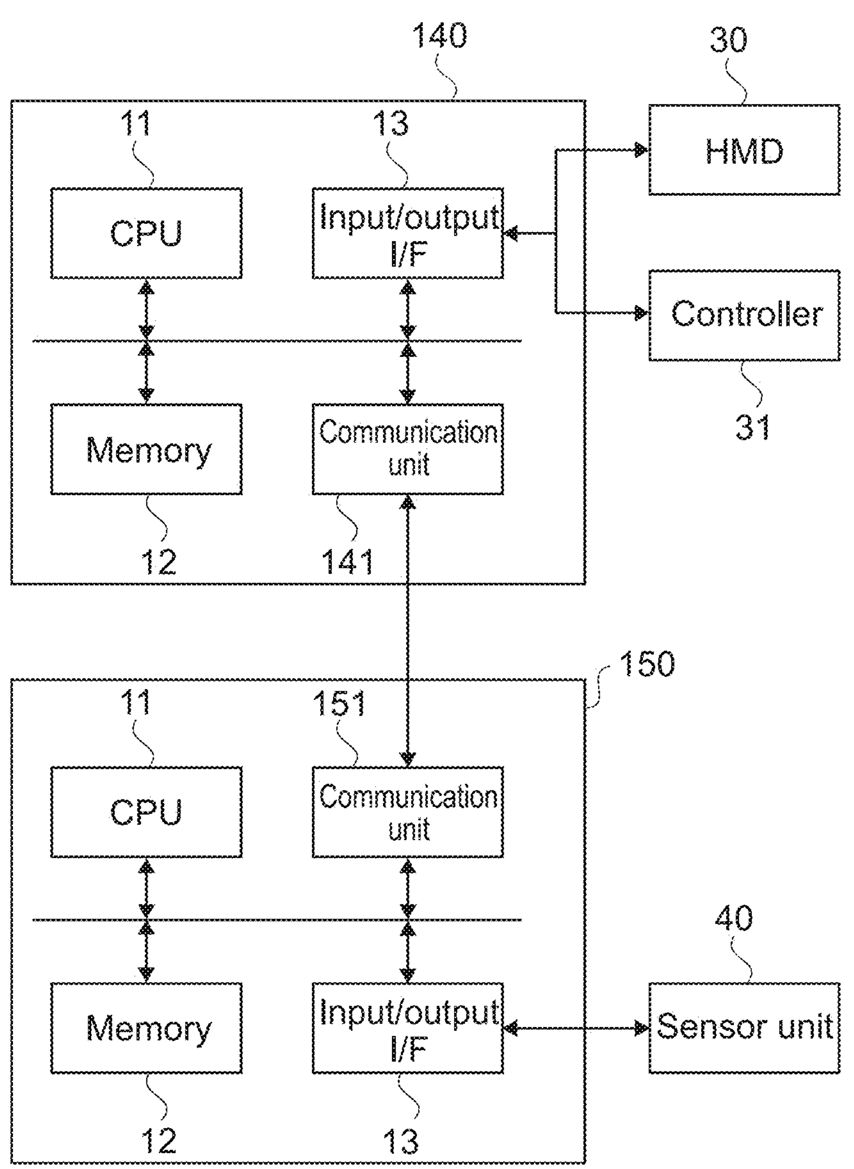
FIG. 11A block diagram showing another hardware configuration example of the display control apparatus.

FIG. 11 is a block diagram showing another hardware configuration example of the display control apparatus.

As shown in FIG. 11, a display side apparatus 140 and a sensor side apparatus 150 may transmit/receive the sensor information via a communication unit 141 (151). For example, the communication unit 141 (151) may be a modem, a router, or another communication apparatus for communicating with another device, which is connectable to a LAN, a WAN, or the like. Moreover, the communication unit 141 (151) may perform wired or wireless communication.

In the above-mentioned embodiment, the HMD 30 such as a VR headset is used and the virtual object 3 and the operating part 2 are displayed in the virtual space 5. The present technology is not limited thereto, and the virtual object may be displayed by a video see-through-type.

In the video see-through, in a case where there is a real object such as the hand of the user 1 or the controller in the position where the virtual object is displayed, the virtual object is always displayed in front of the real object and the real object cannot be seen.

An example in which a display relationship between such a virtual object and the real object in the video see-through will be described with reference to FIGS. 12 to 19.

Figure 12:
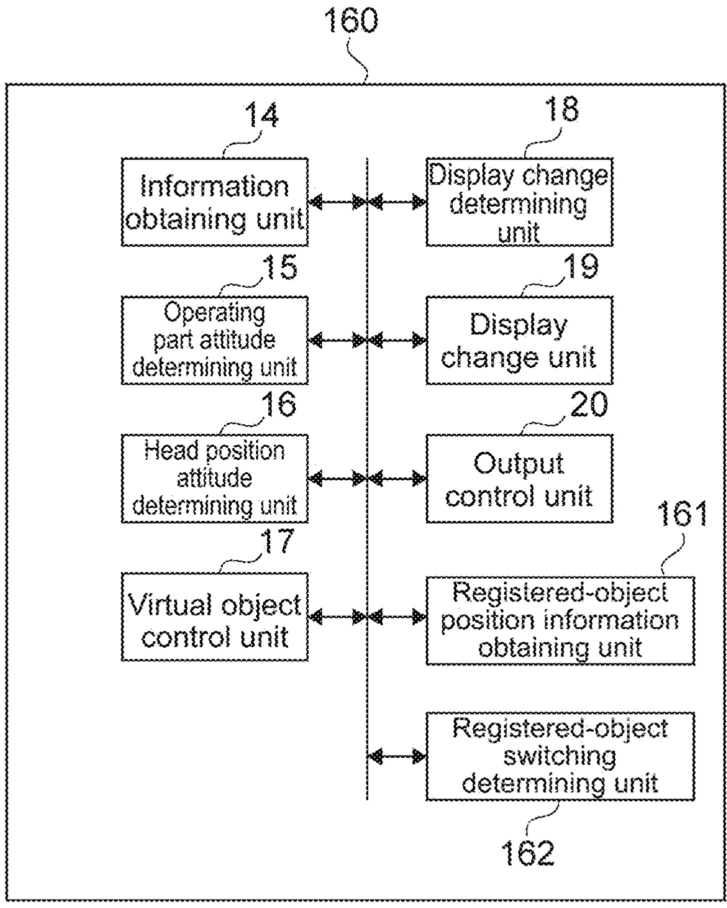
FIG. 12A block diagram showing a functional configuration example of the display control apparatus.

FIG. 12 is a block diagram showing a functional configuration example of the display control apparatus 160.

As shown in FIG. 12, a display control apparatus 160 includes a registered-object position information obtaining unit 161 and a registered-object switching determining unit in addition to the information obtaining unit 14, the operating part attitude determining unit 15, the head position attitude determining unit 16, the virtual object control unit 17, the display change determining unit 18, the display change unit 19, and the output control unit 20.

The registered-object position information obtaining unit 161 obtains position information of the registered object obtained by the information obtaining unit 14. The registered object refers to a registered object of real objects located around the user 1. For example, it includes the user's hand, a controller, a display, a personal computer (PC), a keyboard, a mouse, a cup, a pen, a wall, a floor, a ceiling, and a light.

It should be noted that the registered object is arbitrarily set. For example, it may be set in advance or may be set by a particular motion such as knocking, touch, or pointing by the user during running of an application. Moreover, for example, it may be set by combination of a particular motion, e.g., the user's shaking his or her neck while seeing the real object, or all real objects located at 1 m or less from the user may be set as registered objects. Moreover, for example, a consumer barcode or a QR code (registered trademark) may be scanned in advance and a 3D model may be loaded. Moreover, the above-mentioned method may be used as a method of cancelling the registered object.

The registered-object switching determining unit 162 determines whether or not there is a registered object between the user's eyes and the virtual object on the basis of position information of the user's eyes (head), position information of the registered object, and position information of the virtual object.

The display change unit 19 performs superimposition of the virtual object on the registered object on the basis of a determination result of the registered-object switching determining unit 162. It should be noted that as the virtual object superimposed here, a virtual object of the hand mimicking the user's hand, a virtual object of an object that the user holds in his or her hand, such as a pen, or the like is superimposed. It should be noted that the size of the superimposed virtual object may be controlled in accordance with the height of the user, such as an adult or child, and the size of the hand (registered object).

That is, an operating part or a virtual object depending on a real object associated with the operating part is superimposed. Otherwise, in a case where the registered object is a VR controller, a 6DOF (degrees of freedom) mouse, a 6DOF pen, or a 6DOF ring, a virtual object depending on such a device is superimposed.

It should be noted that in the present embodiment, the registered-object switching determining unit 162 corresponds to a third determining unit that determines whether or not a registered object is included in a predetermined region based on the viewpoint of the user and the position of the virtual object.

Figure 13:
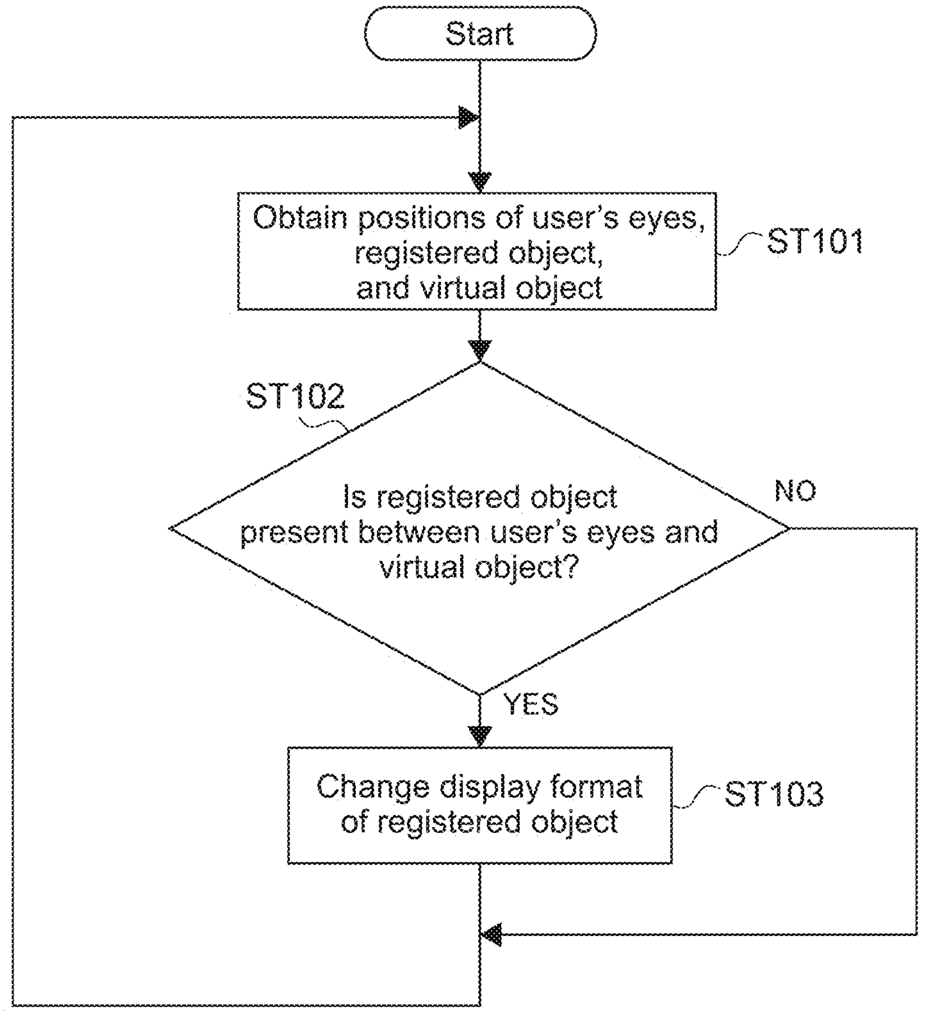
FIG. 13A flowchart showing a control example of a display format of a registered object.
Figure 14:
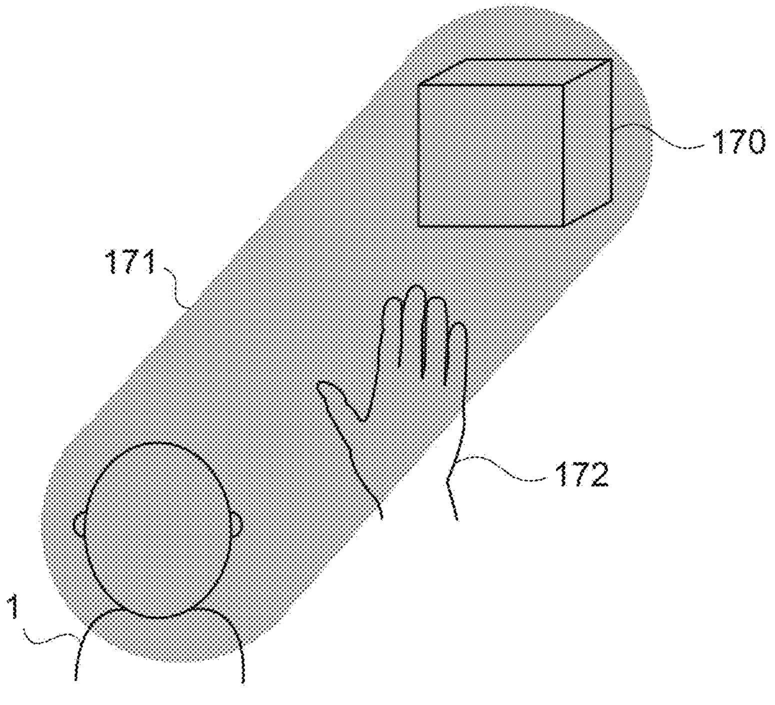
FIG. 14A view schematically showing superimposition of a collider and a virtual object.
Figure 14:
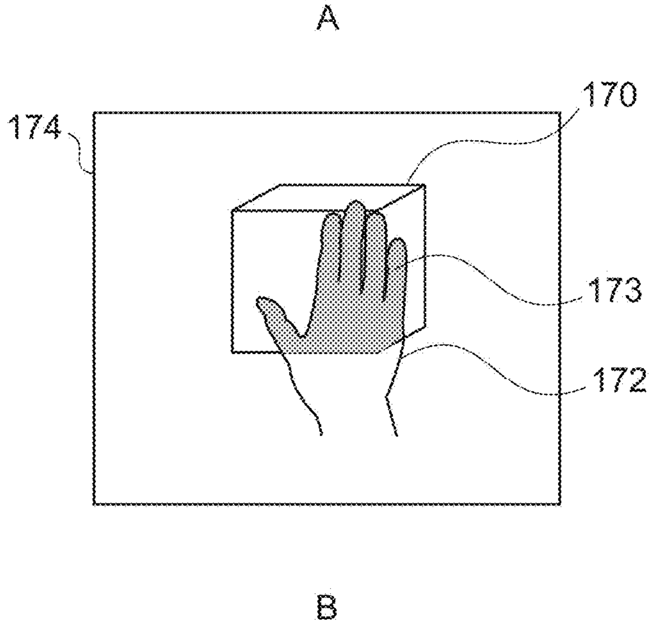

FIG. 13 is a flowchart showing a control example of a display format of a registered object. FIG. 14 is a view schematically showing superimposition of a collider and a virtual object.

As shown in FIG. 13, the position information of the user's eyes is obtained by the head position attitude determining unit 16, the position information of the registered object is obtained by the registered-object position information obtaining unit 161, and the position information of the virtual object is obtained by the virtual object control unit 17 (Step 101).

The registered-object switching determining unit 162 determines whether or not there is a registered object between the user's eyes and the virtual object (Step 102). In the present embodiment, a collider is installed between the user and the virtual object and the determination in Step 102 is performed based on whether or not the collider collides with (enters) the registered object. Hereinafter, a virtual object that is a target in which the collider is installed will be referred to as a target virtual object.

As shown in A of FIG. 14, a collider 171 is installed to cover a target virtual object 170 by using the user 1 wearing the HMD as a reference. For example, the collider 171 is installed on the basis of position information such as the viewpoint of the user 1, the face orientation, and the line of eyesight and position information of the target virtual object 170.

The shape of the collider is not limited, and may be a columnar shape shown in A of FIG. 14 or any shape such as a cone shape, a rectangular parallelepiped shape, or an elliptical shape may be set. Moreover, the size of the collider is also not limited. Typically, it is set to have a size sufficiently including the entire target virtual object 170. However, the size may be set to include a portion of the target virtual object 170. For example, in a case where there is an especially important part in the target virtual object 170, a collider including only the part may be set.

Moreover, the number of colliders installed is also not limited. For example, in a case where there are two or more target virtual objects, the same number of colliders as the number of target virtual objects may be installed. Moreover, for example, a plurality of colliders may be installed for a single target virtual object.

In a case where a registered object 172 (hand) collides with (is included in) the installed collider 171, it is determined that there is registered object between the user's eyes and the virtual object (YES in Step 102).

The display change unit 19 changes the display format of the registered object (Step 103). As shown in B of FIG. 14, the virtual object is superimposed on the hand which is the registered object 172. In B of FIG. 14, a virtual object 173 is superimposed on a portion of the registered object 172 where the target virtual object 170 and the registered object 172 overlap each other. The present technology is not limited thereto, and in the case of YES in Step 102, the virtual object may be superimposed on the entire registered object 172.

It should be noted that the determination in Step 102 may be performed by a method other than the collider. For example, as shown in FIG. 14, in a case where the registered object 172 and the target virtual object 170 overlap each other on the basis of a rendered video 174 displayed on the HMD, it may be determined that there is a registered object between the user's eyes and the virtual object. Moreover, for example, a rendering image without a target virtual objects may be compared with a rendering image with a target virtual object and it may be determined on the basis of a difference in the region of the registered object.

Figure 15:
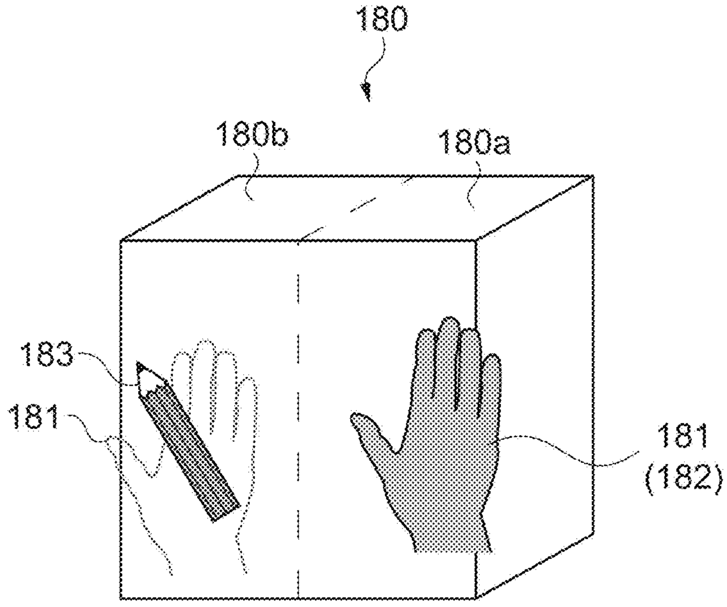
FIG. 15A view showing a specific example of a virtual object superimposed on a registered object.

FIG. 15 is a view showing a specific example of a virtual object superimposed on a registered object.

As described in FIG. 13, in the present embodiment, the virtual object 173 is superimposed on the registered object 172 by the display change unit 19 when the registered object 172 enters the collider 171. In this case, typically, it is only one kind of virtual object that is superimposed when the registered object is located in the collider. For example, in a case where the hand is the registered object, the virtual object mimicking the hand continues to be superimposed.

In FIG. 15, a virtual object 182 superimposed in accordance with the position of a registered object 181 is changed with respect to a single target virtual object 180. As shown in FIG. 15, in a case where the registered object 181 is located on a right side (180*a*) of the target virtual object 180, the virtual object 182 of the hand is superimposed. Moreover, in a case where the registered object 181 is located on a left side (180*b*) of the target virtual object 180, a virtual object 183 of the pencil is superimposed.

In a case of performing such processing, the virtual object to be superimposed may be changed on the basis of relative position information of the target virtual object 180 and the registered object 181. Alternatively, two colliders may be set with respect to the target virtual object 180 divided into left and right and the virtual object may be changed by collision determination with the collider.

Figure 16:
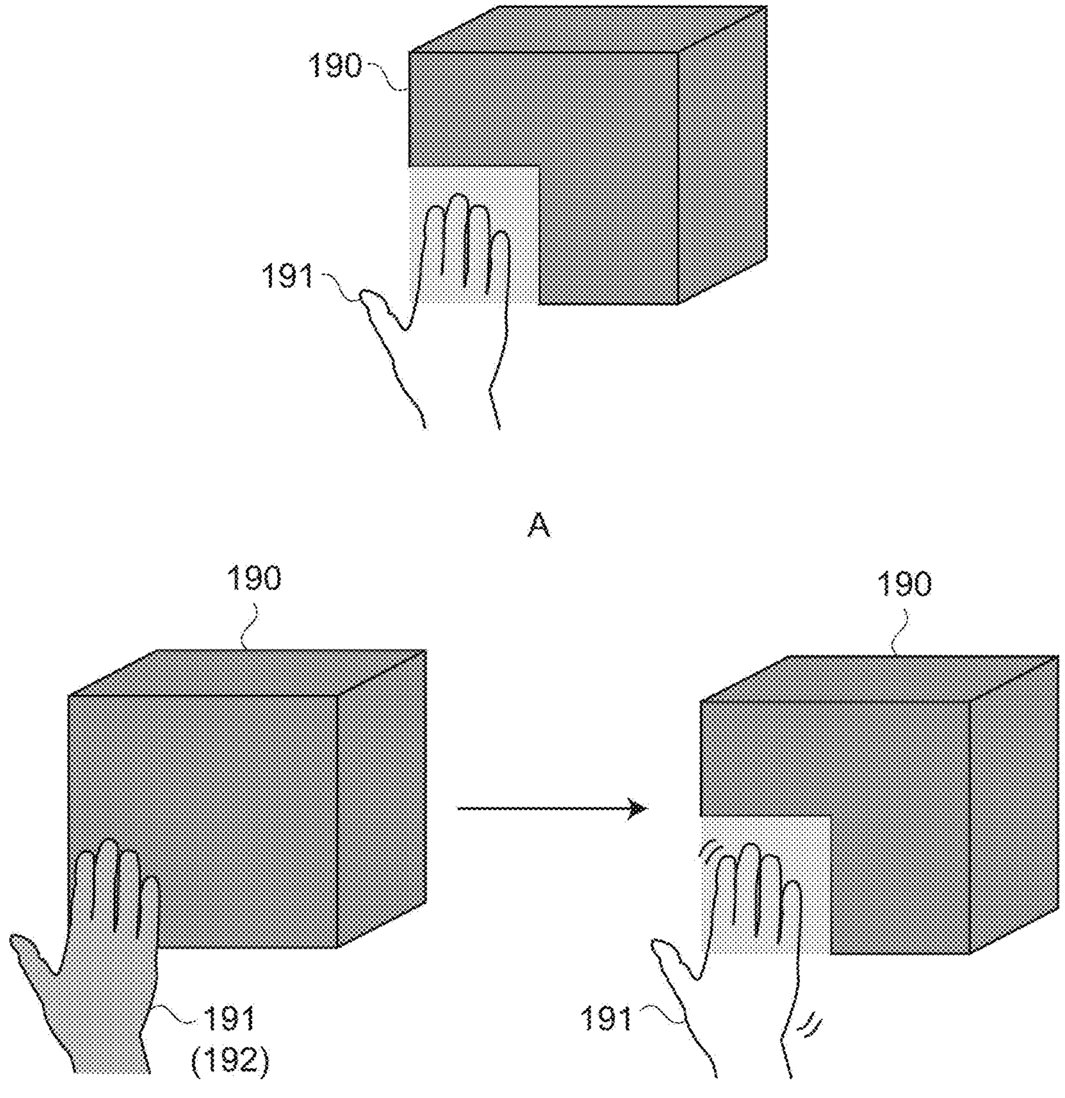
FIG. 16A view showing a control example of a display format of a target virtual object.

FIG. 16 is a view showing a control example of a display format of a target virtual object. In the above description, the virtual object is superimposed so that the user can visually recognize the registered object. The present technology is not limited thereto, and the registered object may be capable of being visually recognized by controlling the transparency of the target virtual object.

For example, as shown in A of FIG. 16, the display change unit 19 reduces the transparency of a target virtual object 190 in a portion where the target virtual object 190 overlaps a registered object 191 (the user's hand in the reality). Accordingly, the user's hand in the reality becomes visible.

Moreover, for example, by performing a gesture, e.g., waving the registered object 191 as a hand as shown in B of FIG. 16, the transparency of the target virtual object 190 in the overlapping portion is reduced. In a case where the user wishes to see the hand in the reality in this manner, the transparency of the target virtual object 190 may be controlled to decrease by performing a particular motion.

Moreover, the particular motion is not limited to the motion by the registered object, and the transparency of a portion or whole of the target virtual object may be decreased by an operation other than the registered object, e.g., the user continuing to see the virtual object superimposed on the real hand for a predetermined time or shaking his or her neck laterally. Moreover, a virtual object 192 superimposed on the hand may be erased at the same time.

Figure 17:
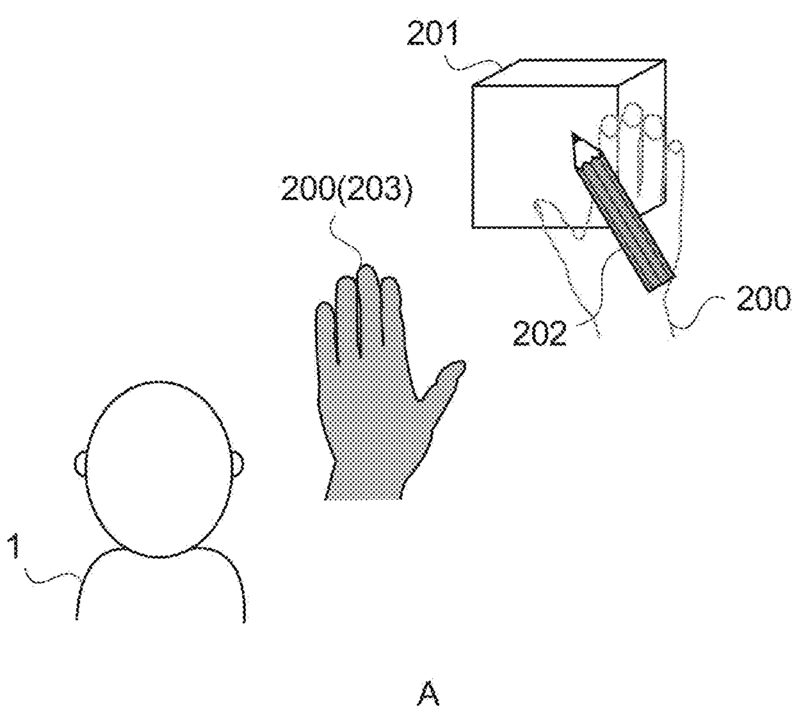
FIG. 17A view showing an example of control of a virtual object superimposed on a registered object.
Figure 17:
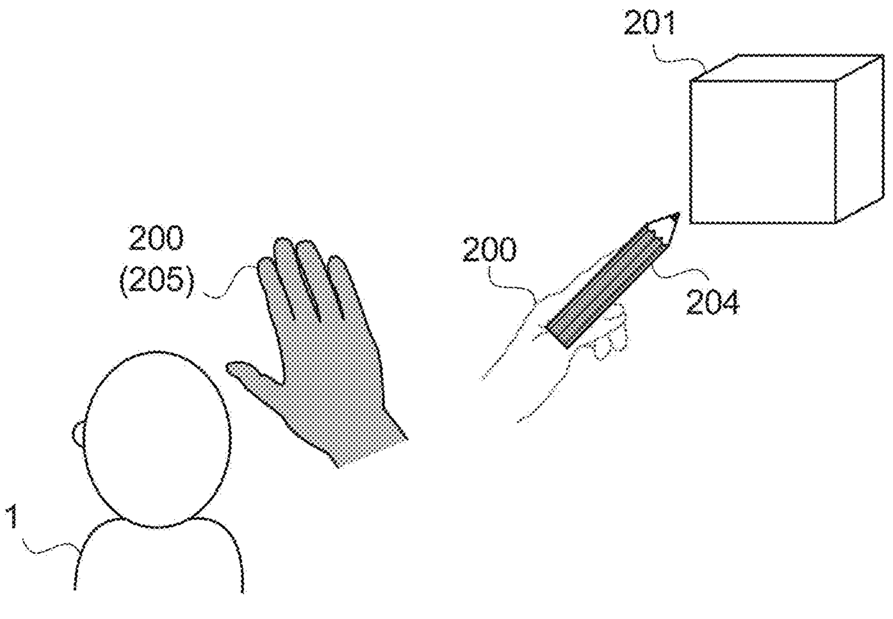

FIG. 17 is a view showing an example of control of a virtual object superimposed on a registered object. In FIG. 17, the virtual object is superimposed on the basis of an orientation, a tilt, and the like of a registered object 200.

For example, as shown in A of FIG. 17, in a case where the registered object 200 is a hand, a virtual object 202 is superimposed when the palm is oriented toward a target virtual object 201. Moreover, for example, when the palm is oriented toward the user 1, a virtual object 203 of the hand is superimposed.

That is, in the present embodiment, in accordance with the orientation of the hand that is the registered object 200, it is determined whether or not the user 1 wishes to perform an operation on the target virtual object 201. If the palm is oriented to the target virtual object 201, it is determined that the user wishes to perform the operation and a virtual object suitable for the operation is superimposed. If the palm is not oriented to the target virtual object 201, it is determined that the user does not wish to perform the operation and a virtual object not related to the operation is superimposed.

It should be noted that "the virtual object suitable for the operation" is a virtual object according to the operation performed by the user on the virtual object including the target virtual object. For example, with respect to the operation that the user wishes to perform, such as writing letters on a notebook as a virtual object, a virtual object of stationery goods such as a pen or a pencil is superimposed. This operation performed by the user may be set by metadata being applied to the virtual object or may be set in advance by the user performing mode selection for performing an operation on a writing mode, a retaining mode, or the like.

For example, as shown in B of FIG. 17, in a case where the registered object 200 is a hand, it is assumed that the fingers are pointing to the target virtual object 201. In this case, a virtual object 204 of a pen is superimposed on the registered object 200. Moreover, for example, in a case where the registered object 200 is a pointer, the virtual object is superimposed by the pointer emitting a light beam to the target virtual object 201.

Moreover, in a case where the registered object 200 is not oriented in the direction of the target virtual object 201, a virtual object 205 not related to the operation is superimposed.

Figure 18:
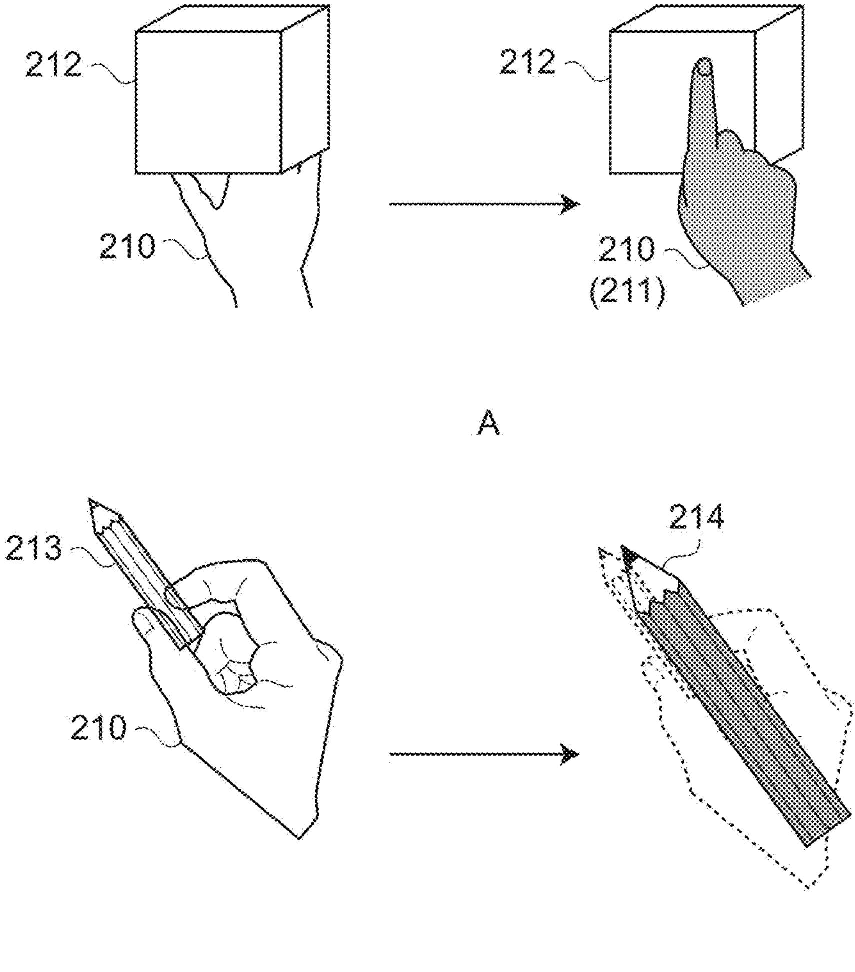
FIG. 18A view showing superimposition of a virtual object according to a particular gesture.

FIG. 18 is a view showing superimposition of a virtual object according to a particular gesture.

In A of FIG. 18, in a case where an operation object is a hand 210, it is determined whether or not a virtual object 211 is superimposed in accordance with a gesture (shape) of the hand 210. As shown in A of FIG. 18, in a case where the hand 210 is opened, the virtual object is not superimposed and a target virtual object 212 hides the hand 210. Here, in a case where the hand 210 has performed a gesture of extending only the index finger, the virtual object 211 mimicking the hand is superimposed. It should be noted that the virtual object may hidden by a particular gesture or switching between display and non-display may be performed.

Moreover, in a case where the operation object is the hand 210 as shown in B of FIG. 18, when the hand 210 has held a particular object, a virtual object mimicking the held object is superimposed. For example, when the hand 210 has held a pencil 213, a virtual object 214 of a pencil is superimposed. Moreover, a virtual object mimicking the hand may be superimposed for example by holding the particular object. That is, holding the particular object may be set as a condition for superimposing the virtual object.

It should be noted that the held object may be set as the registered object or does not need to be set. For example, in a case where nothing is set as the registered object, an object may be recognized by a sensor of a camera or the like and a virtual object mimicking the object may be superimposed.

The virtual object may be controlled by various gestures other than the above-mentioned gesture. For example, in a case where the operation object is kept still for a predetermined time, superimposition of the virtual object may be controlled to be hidden. It is because it can be considered that it is the situation where the user wishes to see details of the target virtual object.

It should be noted that the still state of the operation object refers to a state in which the entire hand is still (coordinates do not change). That is, in a case where a portion of the operation object is moving, e.g., the fingers are moving, the virtual object may be superimposed.

Moreover, for example, in a case where the operation object is moved at a predetermined velocity, superimposition of the virtual object may be controlled to be hidden. It is because display and non-display of the virtual object are continuously presented if the virtual object is superimposed when the operation object is moved quickly. Moreover, the transparency of the virtual object may be reduced other than non-display of the virtual object.

It should be noted that the virtual object may be superimposed in accordance with various user actions other than the gesture by the operation object. For example, in a case where the user continues to see the virtual object for a predetermined time, the virtual object superimposed on the operation object may be erased and the transparency of the portion overlapping the operation object of the target virtual object may be reduced (see A of FIG. 16).

In this manner, control of superimposition, non-display, and the like of the virtual object is not limited to the collision with the collider, and may be controlled in accordance with a gesture of the operation object or a user action as shown in the above. That is, in addition to the collision with the collider, the display format may be controlled under various conditions.

Figure 19:
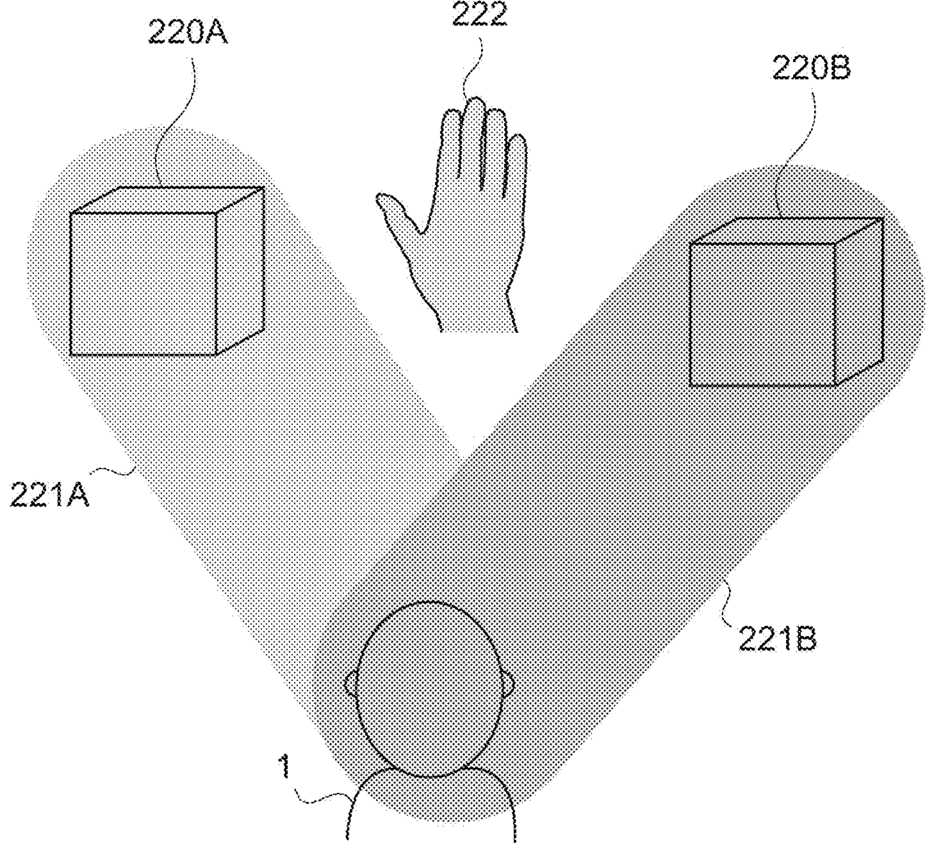
FIG. 19A schematic view showing a specific example when a virtual object is superimposed on a registered object outside a collider region.

FIG. 19 is a schematic view showing a specific example when a virtual object is superimposed on a registered object outside a collider region.

In the above-mentioned example, the virtual object is superimposed by the registered object colliding with the collider, i.e., being located within the collider region. The present technology is not limited thereto, and in a case where there is a plurality of target virtual objects and a distance between the target virtual objects is short, superimposition of the virtual object may be continued even when the registered object is located outside the collider region.

As shown in FIG. 19, with respect to a target virtual object 220A and a target virtual object 220B, a collider 221A and a collider 221B using the user 1 as a reference are set. In FIG. 19, a registered object 222 (hand) is located outside the region of the colliders 221A and B.

Since a registered object 212 typically does not collide with a collider 221, superimposition of the virtual object is not performed. However, in a case where a particular condition that for example the distance between the target virtual object 220A and the target virtual object 220B is short has been satisfied, superimposition of a virtual object 223 is continued.

It is because in a case where there is a plurality of target virtual objects and the hand is located between the target virtual objects, a momentarily superimposed virtual object disappears, which increases switching processing of the virtual object.

It should be noted that it is assumed that in a case where the registered object 222 is located within the region of the collider 221A, a hand is superimposed as a virtual object. Moreover, it is assumed that in a case where the registered object 222 is located within the region of the collider 221B, a pencil is superimposed as a virtual object. In a case where the virtual object to be superimposed differs for each collider in this manner, superimposition of the virtual object of the hand is continued when the registered object exits the collider 221A or superimposition of the virtual object of the pencil may be continued when the registered object exits the collider 221B.

In the above-mentioned embodiment, the virtual object is superimposed by the registered object colliding with the collider. The present technology is not limited thereto, and a function of switching between a mode on which the virtual object is superimposed and a mode on which the virtual object is not superimposed may be used. That is, on the mode on which the virtual object is not superimposed, the collider is not set or the virtual object is not superimposed even when the registered object collides with the collider.

In the above-mentioned embodiment, the virtual object superimposed on the registered object is controlled by switching of display or non-display. The present technology is not limited thereto, and the virtual object may be gradually superimposed from the portion in which the registered object and the target virtual object overlap each other. That is, control may be performed so that the virtual object is not immediately superimposed and the non-transparency becomes 100% for a predetermined time.

In the above-mentioned embodiment, the virtual object is superimposed on the registered object registered by the user. The present technology is not limited thereto, and in a case where the other person's hand, controller, or the like collides with the collider installed using the user as a reference, the virtual object may be superimposed on the other person's hand, controller, or the like. Otherwise, the virtual object may be superimposed on a registered object set by the other user.

In the above-mentioned embodiment, only display or non-display of the virtual object is performed. The present technology is not limited thereto, and a sound or a tactile sense may be presented when the virtual object is superimposed. All visuals, a sound, a tactile sense, and the like may be presented or only any one of them may be presented. Moreover, color information of the virtual object to be superimposed may be controlled for example in accordance with colors and the like of the target virtual objects, the users, and the environment. That is, in a case where the color of the surrounding environment is similar to the color of the virtual object to be superimposed, it is difficult for the user to realize whether the virtual object is superimposed, and therefore color information of the color, color saturation, color brightness, and the like may be controlled.

In the above-mentioned embodiment, in a case where the hand is the registered object, the virtual object is superimposed in accordance with the object held by the hand. The present technology is not limited thereto, and in a case where the user holds a harmful object such as scissors or a cutter, in a case where there is a harmful object around the user, or in a case of a dangerous situation where, for example, there is a fire around the user, the virtual object to be superimposed on the hand may be hidden and the transparency of the target virtual object may be decreased.

By the above-mentioned control, the virtual object is superimposed on the registered object when the registered object overlaps the target virtual object, such that the positional relationship can be easily realized. Moreover, the positional relationship is made easy to realize as necessary while keeping actual information of the hand or the controller that is the registered object, such that the operation becomes easy. Moreover, by controlling the virtual object to be superimposed in accordance with the user's motion, necessary control on the virtual object of the display format can be performed as necessary.

In the above-mentioned embodiment, display format of a single operating part is controlled for a single target virtual object. The present technology is not limited thereto, and a plurality of target virtual objects may be employed or a plurality of operating parts may be employed. For example, the respective fingers of the hand that is the operating part may be in contact with the plurality of virtual objects. In this case, control of the display format that differs for each finger may be performed. A plurality of other virtual objects other than the target virtual objects may also be employed.

In the above-mentioned embodiment, the display format of at least the portion of the operating part other than the feature information is controlled. The present technology is not limited thereto, and the user may arbitrarily set whether or not to control the display format of the feature information.

In the above-mentioned embodiment, the outline of the higher-transparency portion of the operating part is highlighted and displayed. The present technology is not limited thereto, and the operating part may be highlighted and displayed on the basis of the distance between the operating part and the virtual object. For example, the operating part may blink, light may be emitted in a predetermined color, or a predetermined animation may be superimposed on the operating part.

In the above-mentioned embodiment, the display format is controlled when the operating part is in contact with the virtual object. The present technology is not limited thereto, and the above-mentioned control of the display format may be performed even in a case where the operating part is performing a remote operation without being in contact with the virtual object. For example, by orienting the operating part (e.g., the hand) to the virtual object positioned out of the operation range of the user, an operation such as moving, pulling, or pushing away the virtual object can be performed. In this case, the display format may be controlled in a case where the operating part is positioned on a line of eyesight connecting the virtual object remotely operated and the viewpoint of the user.

It should be noted that cooperation of software recorded in the memory, the ROM, or the like with hardware resources of the display control apparatus 10 may achieve display control of the display control apparatus 10 having the hardware configurations as described above. Specifically, loading a program that configures the software, which has been stored in the ROM or the like, to the RAM and executing it achieves the display control method according to the present technology.

The display control apparatus 10 installs the program via the recording medium, for example. Alternatively, the display control apparatus 10 may install the program via a global network or the like. Otherwise, any computer-readable non-transitory storage medium may be used.

Cooperation of a computer mounted on a communication terminal with another computer capable of communicating with it via a network or the like may execute the display control apparatus, the display control method, and the program according to the present technology and configure the display control apparatus according to the present technology.

That is, the display control apparatus, the display control method, and the program according to the present technology may be performed not only in a computer system constituted by a single computer but also in a computer system in which a plurality of computers cooperatively operate. It should be noted that in the present disclosure, the system means a set of a plurality of components (e.g., apparatuses, modules (parts)) and it does not matter whether or not all the components are housed in the same casing. Therefore, both of a plurality of apparatuses housed in separate casings and connected to one another via a network and a single apparatus having a plurality of modules housed in a single casing are the system.

Executing the display control apparatus, the display control method, and the program according to the present technology by the computer system includes, for example, both of a case where a single computer executes control of the display format, determination as to the display change, control on the virtual object, and the like, and a case where different computers execute the respective processes. Moreover, executing the respective processes by a predetermined computer includes causing another computer to execute some or all of those processes and acquiring the results.

That is, the display control apparatus, the display control method, and the program according to the present technology can also be applied to a cloud computing configuration in which a plurality of apparatuses shares and cooperatively processes a single function via a network.

The respective configurations such as the virtual object control unit, the display change determining unit, and the display change unit, the control flow of the communication system, and the like, which have been described with reference to the respective drawings, are merely embodiments, and can be arbitrarily modified without departing from the gist of the present technology. That is, any other configurations, algorithms, and the like for carrying out the present technology may be employed.

It should be noted that the effects described in the present disclosure are merely exemplary and not limitative, and further other effects may be provided. The description of the plurality of effects above does not necessarily mean that those effects are provided at the same time. It means that at least any one of the above-mentioned effects is obtained depending on a condition and the like, and effects not described in the present disclosure can be provided as a matter of course.

At least two features of the features of the above-mentioned embodiments may be combined. That is, the various features described in the respective embodiments may be arbitrarily combined across the respective embodiments.

It should be noted that the present technology can also take the following configurations.

(1) A display control apparatus, including
a control unit that controls, on the basis of a viewpoint of a user, a position of an operating part of the user, and a position of a virtual object, a display format of at least a portion of the operating part.

(2) The display control apparatus according to (1), in which
the display format includes at least one of transparency, luminance, enlargement, reduction, or highlighted display of the operating part or superimposition of the virtual object.

(3) The display control apparatus according to (2), in which
the control unit increases transparency of at least a portion of the operating part on the basis of a distance between the operating part and the virtual object.

(4) The display control apparatus according to (2), in which
the control unit increases transparency of at least a portion of the operating part on the basis of a velocity of the operating part in a contact state with the virtual object.

(5) The display control apparatus according to (2), in which
the control unit increases transparency of at least a portion of the operating part on the basis of a size of the operating part.

(6) The display control apparatus according to (2), in which
the operating part includes feature information indicating a feature of the user, and the control unit increases transparency of at least a portion of the operating part other than the feature information.

(7) The display control apparatus according to (2), in which
the control unit increases transparency of at least a portion of the operating part on the basis of a distance between the operating part and the virtual object and highlights and displays an outline of a site of the operating part, which has increased transparency.

(8) The display control apparatus according to (2), in which
the control unit highlights and displays a contact position of the operating part with the virtual object and increases transparency of at least a portion of the operating part other than the contact position.

(9) The display control apparatus according to (1), further including
a suppression unit that suppresses control of the display format on the basis of a predetermined operation executed by the operating part.

(10) The display control apparatus according to (1), further including a first determining unit that determines, on the basis of the viewpoint of the user, the position of the operating part, and the position of the virtual object, whether or not the user is able to visually recognize the virtual object.

(11) The display control apparatus according to (10), in which the first determining unit determines, in a case where the operating part is in contact with the virtual object and the operating part is positioned between the viewpoint of the user and the virtual object, that the user is unable to visually recognize the virtual object.

(12) The display control apparatus according to (1), further including a display control unit that controls a display format of at least a portion of the other virtual object on the basis of the viewpoint of the user, the position of the operating part, a position of a target virtual object to be operated by the operating part, and a position of another virtual object other than the target virtual object.

(13) The display control apparatus according to (12), in which the display format includes transparency of the other virtual object.

(14) The display control apparatus according to (12), further including a second determining unit that determines whether or not the user is able to visually recognize a contact position of the operating part with the target virtual object on the basis of the viewpoint of the user, the position of the operating part, the position of the target virtual object, and the position of the other virtual object.

(15) A display control method executed by a computer system, including controlling, on the basis of a viewpoint of a user, a position of an operating part of the user, and a position of a virtual object, a display format of at least a portion of the operating part.

(16) A program executed by a computer system, including a step of controlling, on the basis of a viewpoint of a user, a position of an operating part of the user, and a position of a virtual object, a display format of at least a portion of the operating part.

(17) The display control apparatus according to (2), further including a setting unit that sets an object including the operating part as a registered object, in which the control unit controls a display format of at least a portion of the registered object on the basis of the viewpoint of the user, a position of the registered object, and the position of the virtual object.

(18) The display control apparatus according to (17), further including a third determining unit that determines whether or not the registered object is included in a predetermined region based on the viewpoint of the user and the position of the virtual object.

(19) The display control apparatus according to (18), in which the control unit superimposes the virtual object on at least a portion of the registered object in a case where the registered object is included in the predetermined region.

(20) The display control apparatus according to (19), in which the control unit superimposes the virtual object on at least a portion of the registered object on the basis of an attitude of the registered object with respect to the virtual object.

(21) The display control apparatus according to (19), in which the display format includes color information related to a color of the virtual object, and the control unit controls the color information on the basis of the virtual object or a surrounding environment of the user.

(22) The display control apparatus according to (9), in which the suppression unit suppresses control of the display format in a case where a surrounding environment of the user or an object following the operating part has a higher degree of danger.

REFERENCE SIGNS LIST

1 user
2 operating part
3 virtual object
6 target virtual object
10 display control apparatus
18 display change determining unit
19 display change unit
31 controller
40 sensor unit
162 registered-object switching determining unit

The invention claimed is:

1. A display control apparatus, comprising circuitry configured to control, based on a viewpoint of a user, a position of an operating part of the user, and a position of a first virtual object, a display format of at least one portion of the operating part, and control a display format of at least one portion of a second virtual object other than the first virtual object, the second virtual object being positioned in between the viewpoint of the user and the position of the operating part of the user, wherein the circuitry controls the display format of the at least one portion of the operating part based on a degree to which the first virtual object is hidden by the operating part when viewed from the viewpoint of the user, and wherein the circuitry controls the display format of the at least one portion of the second virtual object by controlling transparency of each portion of the second virtual object positioned within a predetermined distance from a line connecting the viewpoint of the user with the position of the operating part of the user.

2. The display control apparatus according to claim 1, wherein the display format includes at least one of transparency, luminance, enlargement, reduction, or highlighted display of the operating part, or superimposition of the first virtual object.

3. The display control apparatus according to claim 2, wherein the circuitry controls the display format to increase transparency of the at least one portion of the operating part based on a distance between each portion of the operating part and the first virtual object.

4. The display control apparatus according to claim 2, wherein the circuitry controls the display format to increase transparency of the at least one portion of the operating part based on a velocity of the operating part in a contact state with the first virtual object.

5. The display control apparatus according to claim 2, wherein the circuitry controls the display format to increase transparency of the at least one portion of the operating part based on a size of the operating part.

6. The display control apparatus according to claim 2, wherein the operating part includes feature information indicating a feature of the user, and wherein the circuitry controls the display format to increase transparency of a portion of the operating part other than the feature information.

7. The display control apparatus according to claim 2, wherein the circuitry controls the display format to increase transparency of the at least one portion of the operating part based on a distance between the operating part and the first virtual object, and highlight and display an outline of a site of the operating part, which has increased transparency.

8. The display control apparatus according to claim 2, wherein the circuitry controls the display format to highlight and display a contact position of the operating part with the first virtual object, and increase transparency of a portion of the operating part other than the contact position.

9. The display control apparatus according to claim 1, wherein the circuitry is further configured to suppress control of the display format of the at least one portion of the operating part or the display format of the at least one portion of the second virtual object based on a predetermined operation executed by the operating part.

10. The display control apparatus according to claim 1, wherein the circuitry is further configured to determine, based on the viewpoint of the user, the position of the operating part, and the position of the first virtual object, whether or not the user is able to visually recognize the first virtual object.

11. The display control apparatus according to claim 10, wherein the circuitry determines, in a case where the operating part is in contact with the first virtual object and the operating part is positioned between the viewpoint of the user and the first virtual object, that the user is unable to visually recognize the first virtual object.

12. The display control apparatus according to claim 1, wherein the circuitry controls the display format of the at least one portion of the second virtual object based on the viewpoint of the user, the position of the operating part, the position of the first virtual object to be operated by the operating part, and a position of the second virtual object other than the first virtual object.

13. A display control method executed by a computer system, comprising:

controlling, based on a viewpoint of a user, a position of an operating part of the user, and a position of a first virtual object, a display format of at least one portion of the operating part; and controlling a display format of at least one portion of a second virtual object other than the first virtual object, the second virtual object being positioned in between the viewpoint of the user and the position of the operating part of the user, wherein the display format of the at least one portion of the operating part is controlled based on a degree to which the first virtual object is hidden by the operating part when viewed from the viewpoint of the user, and wherein the display format of the at least one portion of the second virtual object is controlled by controlling transparency of each portion of the second virtual object positioned within a predetermined distance from a line connecting the viewpoint of the user with the position of the operating part of the user.

14. A non-transitory computer-readable storage medium having embodied thereon a program, which when executed by a computer system causes the computer system to execute a method, the method comprising:

controlling, based on a viewpoint of a user, a position of an operating part of the user, and a position of a first virtual object, a display format of at least one portion of the operating part; and controlling a display format of at least one portion of a second virtual object other than the first virtual object, the second virtual object being positioned in between the viewpoint of the user and the position of the operating part of the user, wherein the display format of the at least one portion of the operating part is controlled based on a degree to which the first virtual object is hidden by the operating part when viewed from the viewpoint of the user, and wherein the display format of the at least one portion of the second virtual object is controlled by controlling transparency of each portion of the second virtual object positioned within a predetermined distance from a line connecting the viewpoint of the user with the position of the operating part of the user.

* * * * *